(12) United States Patent
Eguchi et al.

(10) Patent No.: US 7,729,536 B2
(45) Date of Patent: Jun. 1, 2010

(54) BOUNDARY EXTRACTING METHOD, PROGRAM, AND DEVICE USING THE SAME

(75) Inventors: Shinichi Eguchi, Inagi (JP); Naoko Suzuki, Inagi (JP); Yutaka Katsumata, Inagi (JP); Kouichi Kanamoto, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1230 days.

(21) Appl. No.: 10/958,231

(22) Filed: Oct. 6, 2004

(65) Prior Publication Data
US 2005/0226510 A1 Oct. 13, 2005

(30) Foreign Application Priority Data
Mar. 30, 2004 (JP) .............................. 2004-101461

(51) Int. Cl.
G06K 9/34 (2006.01)
G06K 9/00 (2006.01)
(52) U.S. Cl. ...................... 382/173; 382/175; 382/112
(58) Field of Classification Search .............. 382/173, 382/175, 112
See application file for complete search history.

(56) References Cited

U.S. PATENT DOCUMENTS

| 5,757,957 | A |   | 5/1998 | Tachikawa |
| 5,818,976 | A | * | 10/1998 | Pasco et al. .................. 382/289 |
| 5,962,238 | A | * | 10/1999 | Sizto et al. .................. 435/7.24 |
| 5,969,795 | A |   | 10/1999 | Honda |
| 6,005,683 | A | * | 12/1999 | Son et al. ..................... 358/488 |
| 6,289,120 | B1 | * | 9/2001 | Yamaai et al. .............. 382/173 |
| 7,003,161 | B2 |   | 2/2006 | Tessadro |

(Continued)

FOREIGN PATENT DOCUMENTS

CN 1423237 6/2003

(Continued)

OTHER PUBLICATIONS

European Search Report for European Patent Application No. 04021046.0-2218; mailed Mar. 31, 2006.

(Continued)

*Primary Examiner*—Bhavesh M Mehta
*Assistant Examiner*—Bernard Krasnic
(74) *Attorney, Agent, or Firm*—Staas & Halsey LLP

(57) ABSTRACT

An edge detecting method detects edge segments by searching all of the search lines forming an image from an end of the image in a direction perpendicular to the edges. If a line whose edge segment cannot be detected exists, a search is made in all of the search lines from the vicinity of the center of the image toward the end of the image, whereby edge segments are detected. A linear edge is determined from edge segments. A plurality of edge candidates are obtained from the edge segments for all of the search lines, and an optimum candidate is selected from among the edge candidates. Ruled lines are extracted from the source document in the image, and an optimum candidate is selected based on a comparison with a ruled line. As a result, an edge of the source document can be detected with high accuracy even if an image on a background side is unstable, or if materials of the background and the source document are similar.

13 Claims, 20 Drawing Sheets

U.S. PATENT DOCUMENTS

| | | | |
|---|---|---|---|
| 7,006,708 B1 * | 2/2006 | Nako et al. | 382/294 |
| 2001/0014183 A1 * | 8/2001 | Sansom-Wai et al. | 382/289 |
| 2003/0095710 A1 * | 5/2003 | Tessadro | 382/199 |
| 2003/0231803 A1 | 12/2003 | Huang | |
| 2004/0170324 A1 * | 9/2004 | Eguchi et al. | 382/199 |
| 2005/0013494 A1 * | 1/2005 | Srinivasan et al. | 382/233 |

FOREIGN PATENT DOCUMENTS

| | | |
|---|---|---|
| JP | 62-14277 | 1/1987 |
| JP | 6-52309 | 2/1994 |
| JP | 6-52354 | 2/1994 |
| JP | 2002-92606 | 3/2002 |
| WO | WO 9967943 A1 * | 12/1999 |

OTHER PUBLICATIONS

Automatic Extraction of Original Features in a Copy Machine; Research Disclosure, Mason Publications, Hampshire, UK, vol. 328, No. 30, Aug. 1991.

European Office Action for Application No. 04 021 046.0-1224; mailed Jul. 20, 2006.

Chinese Office Action, dated Oct. 27, 2006, issued in reference to Chinese Patent Application No. 200410084194.4.

* cited by examiner

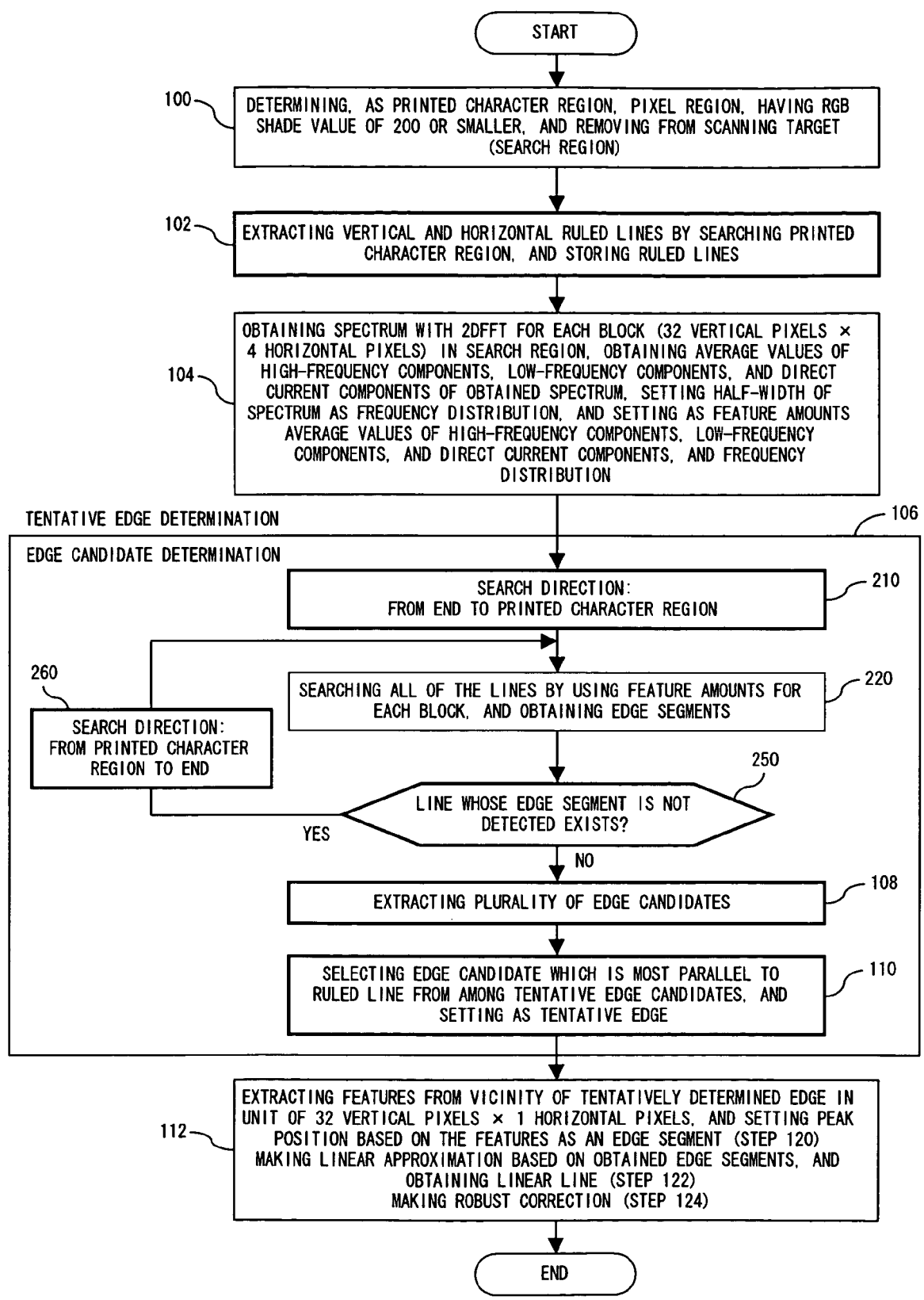
F I G. 1

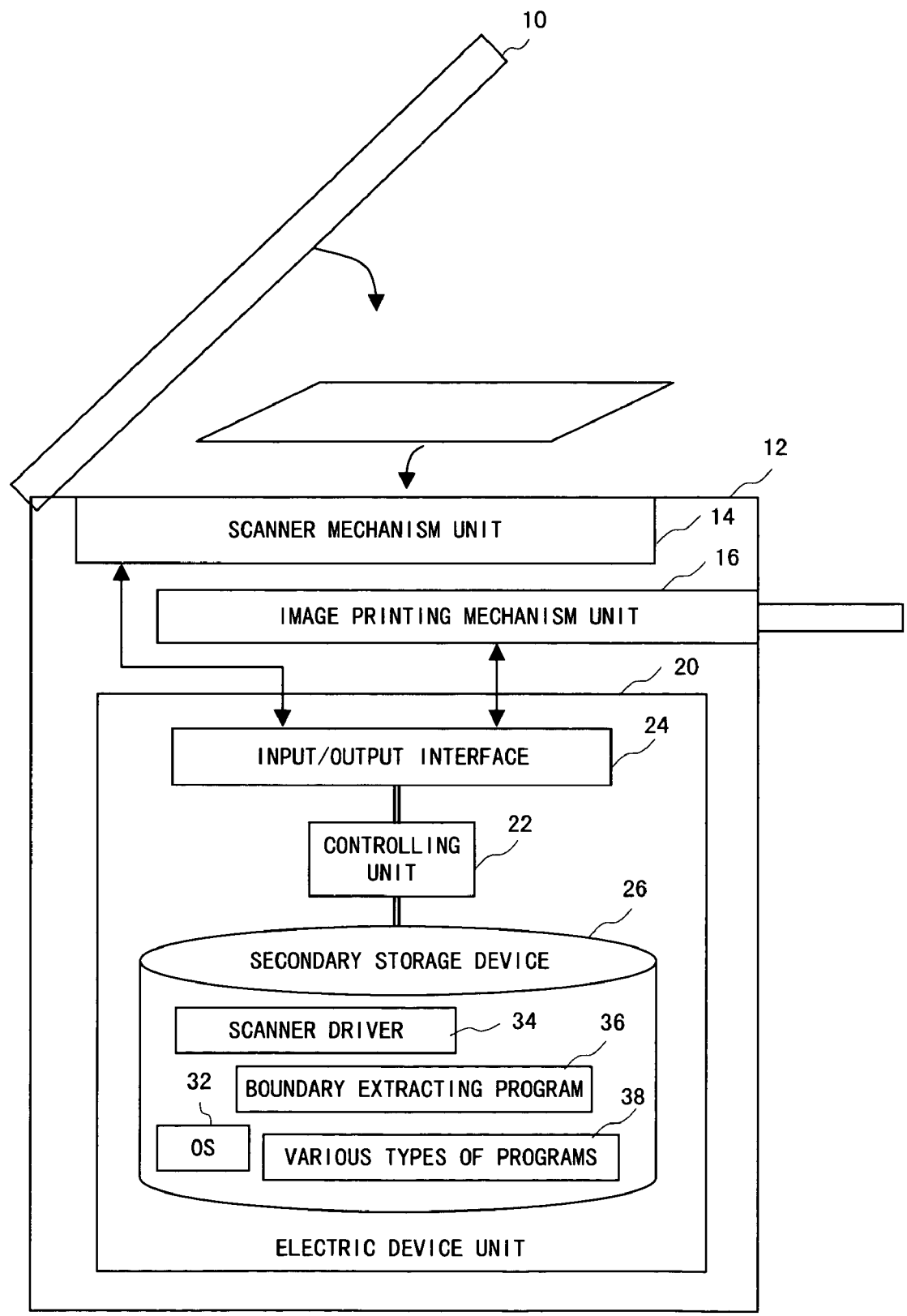
F I G. 2

RESULTS OF 2DFFT FOR SAMPLE IMAGE IN FIG. 3

| X COORDIN ATE | DIRECT CURRENT R | DIRECT CURRENT G | DIRECT CURRENT B | X COORDIN ATE | LOW-FREQUENCY R | LOW-FREQUENCY G | LOW-FREQUENCY B | X COORDIN ATE | HIGH-FREQUENCY R | HIGH-FREQUENCY G | HIGH-FREQUENCY B |
|---|---|---|---|---|---|---|---|---|---|---|---|
| 0 | 252 | 254 | 255 | 0 | 0.32 | 0.18 | 0.00 | 0 | 0.42 | 0.16 | 0.00 |
| 4 | 251 | 254 | 255 | 4 | 0.35 | 0.19 | 0.05 | 4 | 0.30 | 0.15 | 0.05 |
| 8 | 252 | 254 | 255 | 8 | 0.33 | 0.14 | 0.00 | 8 | 0.32 | 0.11 | 0.00 |
| 12 | 252 | 255 | 255 | 12 | 0.33 | 0.12 | 0.01 | 12 | 0.30 | 0.11 | 0.01 |
| 16 | 251 | 254 | 255 | 16 | 0.35 | 0.18 | 0.00 | 16 | 0.39 | 0.16 | 0.00 |
| 20 | 251 | 254 | 255 | 20 | 0.39 | 0.17 | 0.08 | 20 | 0.37 | 0.15 | 0.08 |
| 24 | 251 | 255 | 255 | 24 | 0.33 | 0.13 | 0.00 | 24 | 0.37 | 0.10 | 0.00 |
| 28 | 252 | 254 | 255 | 28 | 0.34 | 0.15 | 0.04 | 28 | 0.29 | 0.14 | 0.04 |
| 32 | 251 | 254 | 255 | 32 | 0.36 | 0.15 | 0.04 | 32 | 0.39 | 0.19 | 0.04 |
| 36 | 251 | 255 | 255 | 36 | 0.38 | 0.11 | 0.02 | 36 | 0.37 | 0.10 | 0.00 |
| 40 | 251 | 254 | 255 | 40 | 0.40 | 0.14 | 0.05 | 40 | 0.33 | 0.10 | 0.05 |
| 44 | 251 | 254 | 255 | 44 | 0.33 | 0.12 | 0.05 | 44 | 0.29 | 0.12 | 0.04 |
| 48 | 251 | 254 | 255 | 48 | 0.37 | 0.16 | 0.00 | 48 | 0.29 | 0.14 | 0.00 |
| 52 | 251 | 254 | 255 | 52 | 0.30 | 0.17 | 0.00 | 52 | 0.35 | 0.16 | 0.00 |
| 56 | 252 | 255 | 255 | 56 | 0.35 | 0.11 | 0.00 | 56 | 0.30 | 0.08 | 0.00 |
| 60 | 251 | 254 | 255 | 60 | 0.33 | 0.14 | 0.00 | 60 | 0.27 | 0.12 | 0.00 |
| 64 | 251 | 254 | 255 | 64 | 0.34 | 0.15 | 0.03 | 64 | 0.34 | 0.13 | 0.00 |
| 68 | 251 | 254 | 255 | 68 | 0.36 | 0.14 | 0.02 | 68 | 0.34 | 0.13 | 0.00 |
| 72 | 252 | 255 | 255 | 72 | 0.34 | 0.12 | 0.00 | 72 | 0.26 | 0.13 | 0.00 |
| 76 | 252 | 255 | 255 | 76 | 0.31 | 0.08 | 0.02 | 76 | 0.30 | 0.08 | 0.02 |
| 80 | 252 | 254 | 255 | 80 | 0.33 | 0.14 | 0.07 | 80 | 0.33 | 0.13 | 0.04 |
| 84 | 251 | 255 | 255 | 84 | 0.36 | 0.13 | 0.00 | 84 | 0.36 | 0.12 | 0.00 |
| 88 | 253 | 255 | 255 | 88 | 0.31 | 0.12 | 0.00 | 88 | 0.26 | 0.13 | 0.00 |
| 92 | 252 | 254 | 255 | 92 | 0.37 | 0.15 | 0.00 | 92 | 0.28 | 0.13 | 0.00 |
| 96 | 252 | 254 | 255 | 96 | 0.31 | 0.14 | 0.00 | 96 | 0.31 | 0.14 | 0.00 |
| 100 | 252 | 255 | 255 | 100 | 0.34 | 0.09 | 0.00 | 100 | 0.36 | 0.09 | 0.00 |
| 104 | 253 | 255 | 255 | 104 | 0.29 | 0.08 | 0.00 | 104 | 0.26 | 0.08 | 0.00 |
| 108 | 252 | 255 | 255 | 108 | 0.36 | 0.08 | 0.00 | 108 | 0.21 | 0.07 | 0.00 |
| 112 | 251 | 255 | 255 | 112 | 0.35 | 0.08 | 0.03 | 112 | 0.32 | 0.08 | 0.03 |
| 116 | 252 | 255 | 255 | 116 | 0.30 | 0.07 | 0.00 | 116 | 0.23 | 0.06 | 0.00 |
| 120 | 253 | 255 | 255 | 120 | 0.28 | 0.07 | 0.00 | 120 | 0.26 | 0.07 | 0.00 |
| 124 | 253 | 255 | 255 | 124 | 0.24 | 0.05 | 0.00 | 124 | 0.20 | 0.04 | 0.00 |
| 128 | 253 | 255 | 255 | 128 | 0.27 | 0.06 | 0.00 | 128 | 0.20 | 0.05 | 0.00 |
| 132 | 251 | 255 | 255 | 132 | 0.32 | 0.09 | 0.02 | 132 | 0.41 | 0.08 | 0.02 |
| 136 | 250 | 253 | 254 | 136 | 0.48 | 0.30 | 0.22 | 136 | 0.40 | 0.22 | 0.18 |
| 140 | 252 | 254 | 254 | 140 | 0.39 | 0.15 | 0.18 | 140 | 0.31 | 0.10 | 0.14 |
| 144 | 253 | 254 | 254 | 144 | 0.30 | 0.17 | 0.14 | 144 | 0.28 | 0.17 | 0.13 |
| 148 | 252 | 255 | 254 | 148 | 0.34 | 0.13 | 0.18 | 148 | 0.37 | 0.11 | 0.21 |
| 152 | 252 | 254 | 254 | 152 | 0.34 | 0.17 | 0.27 | 152 | 0.22 | 0.14 | 0.22 |
| 156 | 253 | 254 | 254 | 156 | 0.33 | 0.14 | 0.19 | 156 | 0.23 | 0.11 | 0.17 |
| 160 | 253 | 254 | 254 | 160 | 0.29 | 0.16 | 0.18 | 160 | 0.20 | 0.14 | 0.15 |
| 164 | 253 | 255 | 254 | 164 | 0.30 | 0.14 | 0.17 | 164 | 0.32 | 0.10 | 0.13 |
| 168 | 253 | 255 | 254 | 168 | 0.26 | 0.13 | 0.16 | 168 | 0.23 | 0.13 | 0.14 |
| 172 | 251 | 254 | 254 | 172 | 0.47 | 0.15 | 0.21 | 172 | 0.34 | 0.12 | 0.17 |
| 176 | 250 | 254 | 253 | 176 | 0.65 | 0.42 | 0.57 | 176 | 0.41 | 0.29 | 0.34 |
| 180 | 252 | 255 | 254 | 180 | 0.38 | 0.13 | 0.18 | 180 | 0.31 | 0.10 | 0.18 |
| 184 | 251 | 254 | 254 | 184 | 0.42 | 0.17 | 0.23 | 184 | 0.28 | 0.18 | 0.20 |
| 188 | 251 | 254 | 254 | 188 | 0.36 | 0.17 | 0.19 | 188 | 0.25 | 0.15 | 0.13 |
| 192 | 251 | 254 | 253 | 192 | 0.41 | 0.18 | 0.27 | 192 | 0.33 | 0.13 | 0.22 |
| 196 | 252 | 254 | 253 | 196 | 0.37 | 0.20 | 0.27 | 196 | 0.27 | 0.15 | 0.29 |
| 200 | 251 | 254 | 253 | 200 | 0.46 | 0.23 | 0.27 | 200 | 0.31 | 0.19 | 0.25 |
| 204 | 251 | 254 | 253 | 204 | 0.51 | 0.18 | 0.26 | 204 | 0.40 | 0.16 | 0.22 |
| 208 | 250 | 254 | 253 | 208 | 0.39 | 0.18 | 0.28 | 208 | 0.30 | 0.15 | 0.24 |
| 212 | 252 | 254 | 253 | 212 | 0.35 | 0.17 | 0.29 | 212 | 0.28 | 0.15 | 0.24 |

F I G. 7

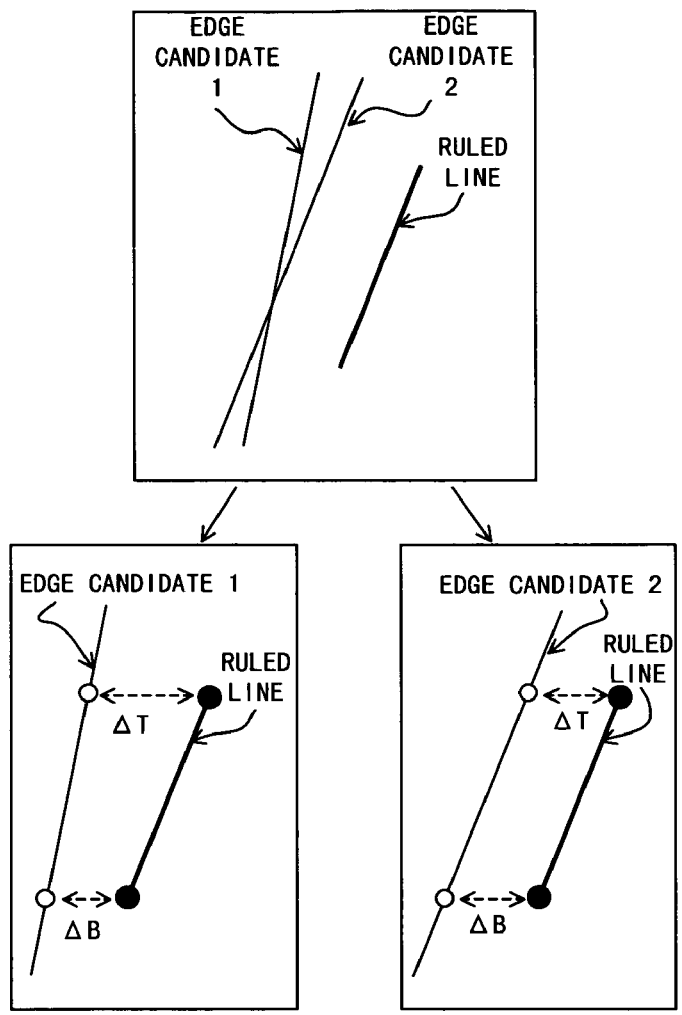
F I G. 1 1 A
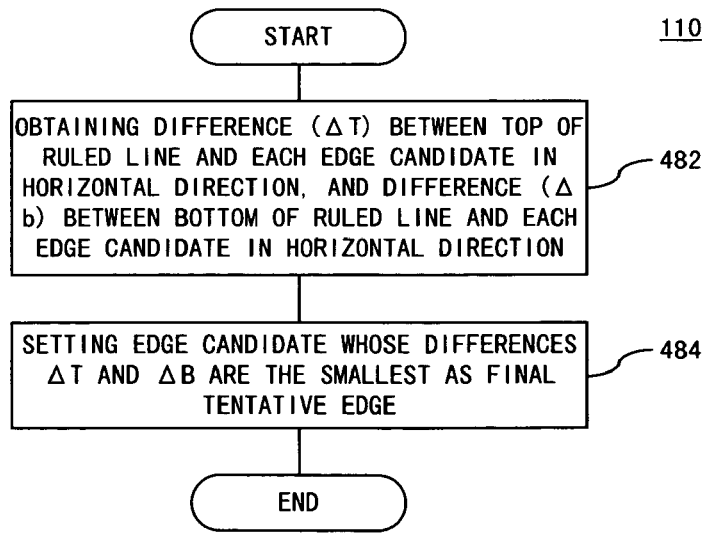
F I G. 1 1 B

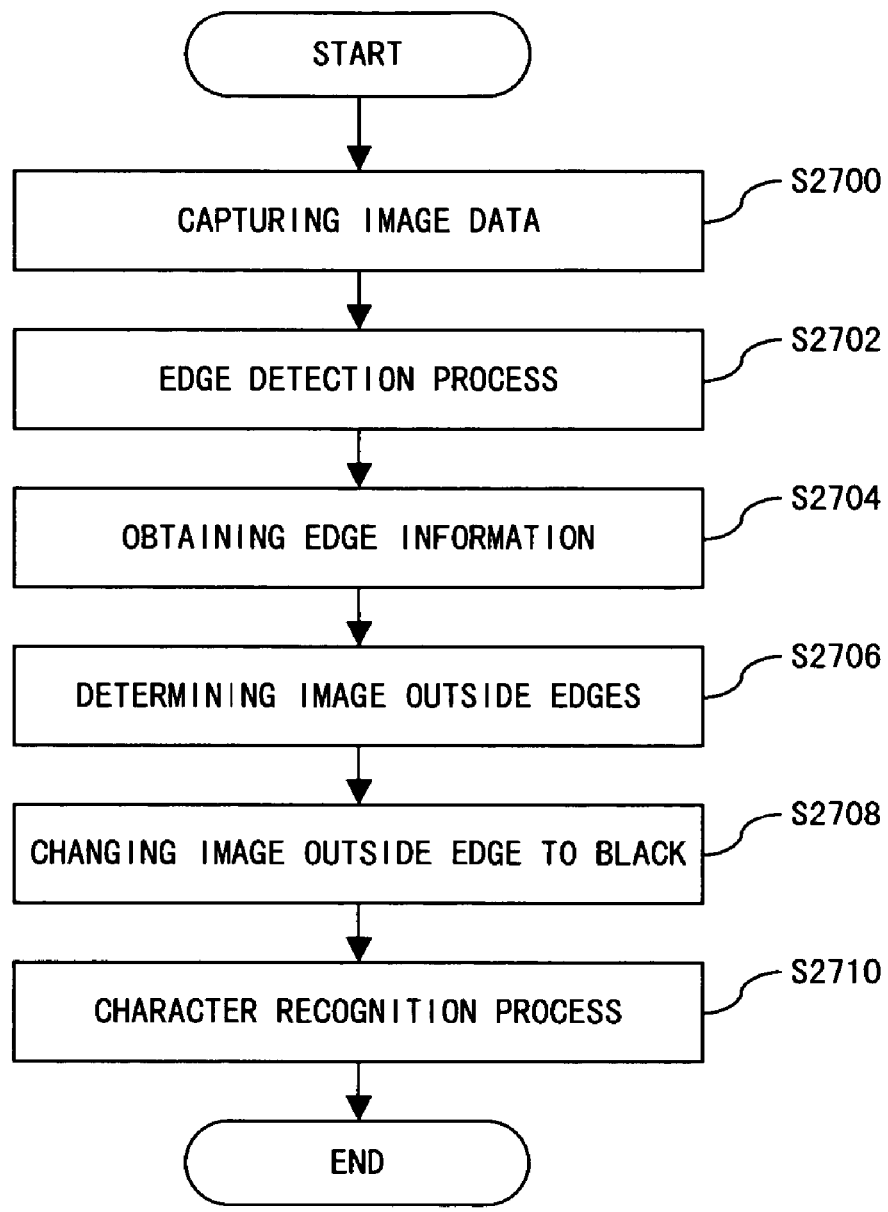
F I G. 2 0

BOUNDARY EXTRACTING METHOD, PROGRAM, AND DEVICE USING THE SAME

BACKGROUND OF THE INVENTION

1. Field of the Invention

The present invention relates to an image processing device, and more particularly, to a technique extracting a paper sheet portion from an image which has been captured with the image processing device and includes a background.

2. Description of the Related Art

As a device that can read a source document made of, for example, paper, etc., an image processing device such as a scanner, a copier, a facsimile, etc. is known. Reading of a source document with such an image processing device is normally made by setting the front side (surface to be read) of a source document on the reading surface of an image reading device, and by putting a source document cover on the back side of the source document. When an image is read, light is irradiated on the front side of the set source document from the side of the reading surface, and reflected light is read with an optical reading unit (CCD) configured on the side of the reading surface. If the size of the source document is smaller than the reading surface, the source document cover (hereinafter referred to as a background) also appears around the source document viewed from the side of the reading surface. Since the background is also read in addition to the front side of the source document when the image is read, obtained image data naturally becomes data where the background appears around the source document.

Accordingly, the inventor, et al. disclosed a technique that does not require a special scheme when an image is captured, and detects an edge of a source document by using a difference between the material of a background and that of the source document only with an image process which is executed after the image is captured (Patent Document 1 implemented in FIG. 2).

[Patent Document 1] Japanese Patent Application No. 2002-370596

However, this technique has a problem that edge detection accuracy deteriorates if the material of a background and that of a source document are similar, or if an image on a background is not stable as in an image that is read with a flat-head scanner.

SUMMARY OF THE INVENTION

An object of the present invention is to provide a technique that can detect an edge of a source document with high accuracy even if an image on a background is unstable, or if the material of the background and that of the source document are similar.

The present invention provides, in one aspect, a method detecting one edge configuring a boundary of a source document by using a difference between materials in an image obtained by capturing the source document with a scanner. The method comprises: a step of detecting edge segments by searching all of search lines forming an image from an end of the image in a direction perpendicular to an edge; a step of detecting edge segments by making a search in all of the search lines from the proximity of the center of the image to an end of the image; and a step of determining a linear line edge from edge segments for all of the search lines.

The edge determining step preferably comprises: a candidate determining step of obtaining a plurality of edge candidates from the edge segments for all of the search lines; and a selecting step of selecting an optimum candidate from among the plurality of edge candidates.

The selecting step may comprise a step of selecting an optimum candidate based on a comparison with a ruled line.

The present invention provides, in another aspect, a boundary detecting program, which is stored onto a storage medium and executed by a CPU, and detects one edge configuring a boundary of a source document from an image obtained by capturing the source document with a scanner in a device comprising the storage medium storing the program, and the CPU (Central Processing Unit) running under the control of the program. This method comprises: a step of detecting edge segments by searching all of search lines forming an image from an end of the image in a direction perpendicular to an edge; a step of detecting edge segments by searching all of search lines from the proximity of the center of the image to an end of the image; and a step of determining a linear edge from edge segments for all of the search lines.

Additionally, the present invention can provide a device having a function for extracting a boundary of a source document from an image obtained by capturing the source document with a scanner by using the above described method.

BRIEF DESCRIPTION OF THE DRAWINGS

FIG. 1 is a flowchart showing operations for detecting one edge of a source document from a captured image, according to the present invention;

FIG. 2 shows a configuration of an image processing device according to one preferred embodiment of the present invention;

FIG. 7 is a data table indicating results of 2DFFT performed for a sample image with the feature emphasis process shown in FIG. 6;

FIG. 11A exemplifies comparisons in a method selecting a tentative edge candidate, which is the most parallel to a ruled line, from among a plurality of tentative edge candidates in step 110;

FIG. 11B is a flowchart exemplifying the method selecting a tentative edge candidate, which is the most parallel to a ruled line, from among a plurality of tentative edge candidates in step 110;

FIG. 20 is a flowchart exemplifying operations of a system extracting a source document from a captured image according to the boundary extracting program of the present invention, and performing character recognition.

DESCRIPTION OF THE PREFERRED EMBODIMENTS

Figure 3:
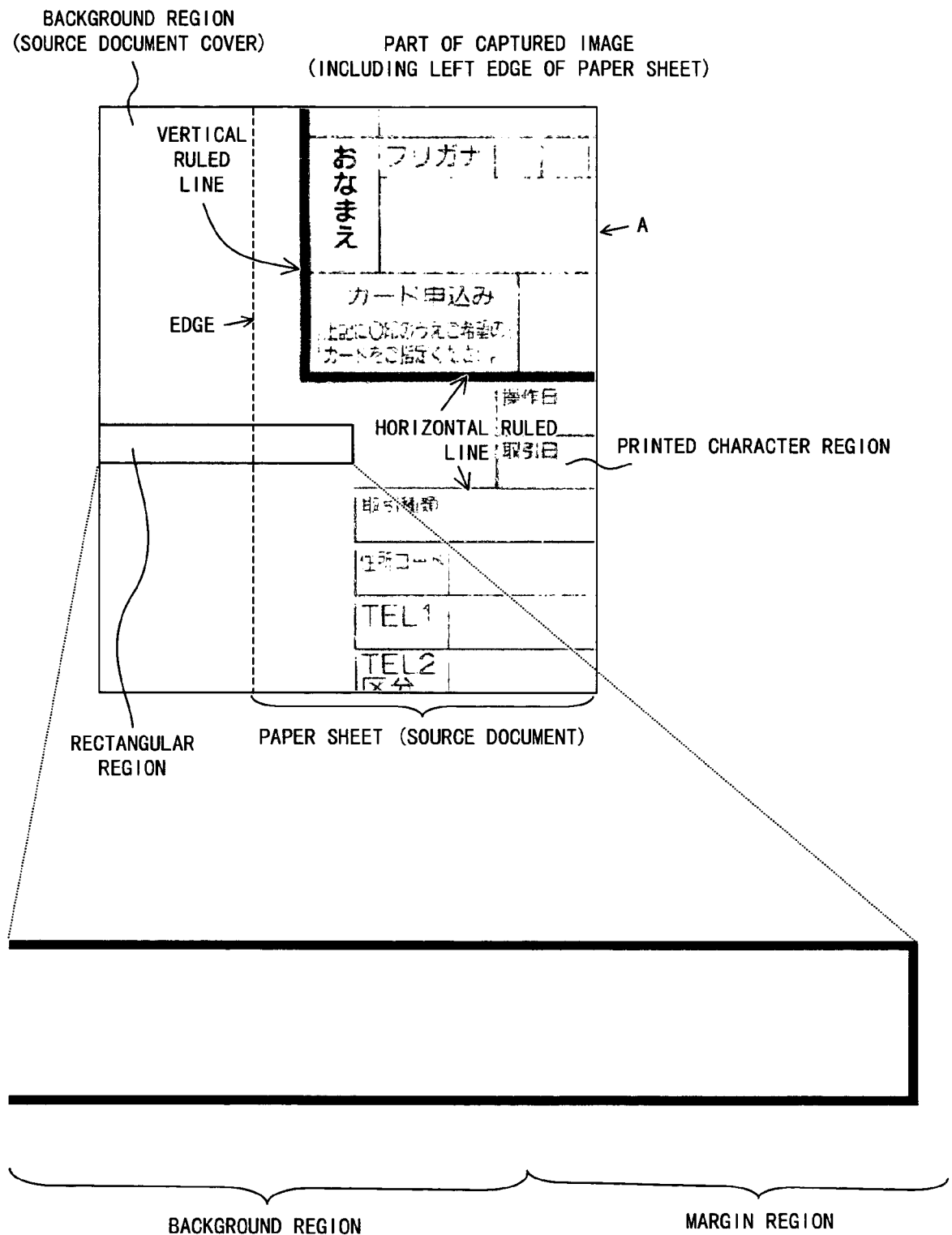
FIG. 3 exemplifies an image from which a boundary is extracted according to the present invention.

Hereinafter, preferred embodiments according to the present invention are described in detail with reference to the drawings. If the same constituent elements are depicted in a plurality of drawings, and the elements are denoted with the same reference numerals.

First Preferred Embodiment

FIG. 2 shows a configuration of an image processing device extracting a source document portion from a captured image, and using the source document portion, according to one preferred embodiment of the present invention. In this figure, an image processing device 1 comprises a main body 12, and a source document cover 10 for covering a source document put on the top surface of the main body. The main body 12 is configured by: a scanner mechanism unit 14, which is a mechanical portion of a scanner reading the source document put on the top surface of the main body 12; an image printing mechanism unit 16, which is a mechanical portion of an image printing device; and an electronic device unit 20 performing a desired function with a cooperation between the scanner mechanism unit 14 and the image printing mechanism unit 16. The electronic device unit 20 is, as is well known, configured by: a controlling unit 22 composed of a CPU (Central Processing Unit), a ROM (Read-Only Memory), a RAM (Random Access Memory), etc., which are not shown; a secondary storage device 26 storing various types of programs and data; and an input/output interface 24 providing an interface between the scanner mechanism unit 14 and the image printing mechanism unit 16. The secondary storage device 26 stores an operating system (OS) 32, a scanner driver 34 capturing an image by cooperating with the scanner mechanism unit, a boundary extracting program 36 detecting an edge from an image captured with the scanner, and various types of programs 38 for implementing the functions of the image processing device 1. As the image processing device shown in FIG. 2, any device may be available if it extracts and processes a source document portion included in an image captured with the scanner. Examples of the image processing device 1 include a copier, a facsimile, an OCR device, an automatic slip processing device, etc.

After a source document is put and read in a predetermined position on the main body of the image processing device 1, the boundary extracting program 36 is called and executed to extract a source document region from the read image. Namely, the left, the right, the top and the bottom edges of the source document are detected. The left, the right, the top and the bottom edges can be detected with similar procedures. Therefore, detection of one edge, by way of example, an edge of the left side is first described.

FIG. 1 is a flowchart showing operations for detecting one edge of a source document from a captured image by the controlling unit 22 under the control of the boundary extracting program 36 according to one preferred embodiment of the present invention. Most part of FIG. 1 is disclosed by the above described Japanese Patent Application No. 2002-370596 (Patent Document 1) filed by the present applicant. Therefore, operational steps according to the principle of the present invention are represented by thick lines in FIG. 1 and detailed description of the disclosed contents is omitted.

FIG. 3 shows part of an image from which the boundary of a paper sheet (or a source document) is to be extracted with the boundary extracting program 36. In this figure, a broken line in the vertical direction is the left edge of the source document, a portion on the right side of the left edge is the source document, and a vertically oriented region on the left side of the left edge is a source document cover. The source document includes horizontal and vertical ruled lines. Operations for detecting an edge of a source document in such an image are described below.

When the boundary extracting program 36 is called, a printed character region of a source document is first detected in step 100. Then, the printed character region is excluded from a process target in processes in and after step 104. Specifically, for example, with a printed character region exclusion process shown in FIG. 4, a pixel region having an RGB shade value of 200 or smaller is identified and stored, and removed from a search target in and after step 104. Exclusion of a printed character region from an original image is shown in FIG. 5. The printed character region exclusion process may be executed according to the flowchart shown in FIG. 4. However, the process is not limited to this implementation, and may be executed with another suitable method. Details of FIG. 4 will be described later.

According to one preferred embodiment of the present invention, vertical and horizontal ruled lines are extracted by searching the printed character region detected in step 100 with a known method in step 102. Thereafter, tentative edges are determined by using the ruled lines detected here (step 110 to be described later).

Next, in step 104, feature emphasis is made in a way such that spectrum is obtained with 2DFFT (2-Dimensional Fast Fourier Transform) for each block set in the search region, average values of high-frequency components, low-frequency components, and direct current components of the obtained spectrum are obtained, the width at half the maximum of the spectrum is set as a frequency distribution, and the obtained average values of the high-frequency components, the low-frequency components, and the direct current components, and the frequency distribution are set as feature amounts. This feature emphasis may be made, for example, with a feature emphasis process shown in FIG. 6. However, the feature emphasis is not limited to this implementation, and may be implemented with another suitable method. Details of FIG. 6 will be described later. FIG. 7 is a data table that represents results of 2DFFT (2-Dimensional Fast Fourier Transform) performed for a sample image with the feature emphasis process shown in FIG. 6.

Next, in step 106, an edge is obtained by using the feature amounts obtained in step 104, and the obtained edge is determined as a tentative edge. This tentative edge determination step 106 is composed of an edge candidate determination step 106, a multiple edge candidates extraction step 108, and a tentative edge selection step 110.

Figure 9:
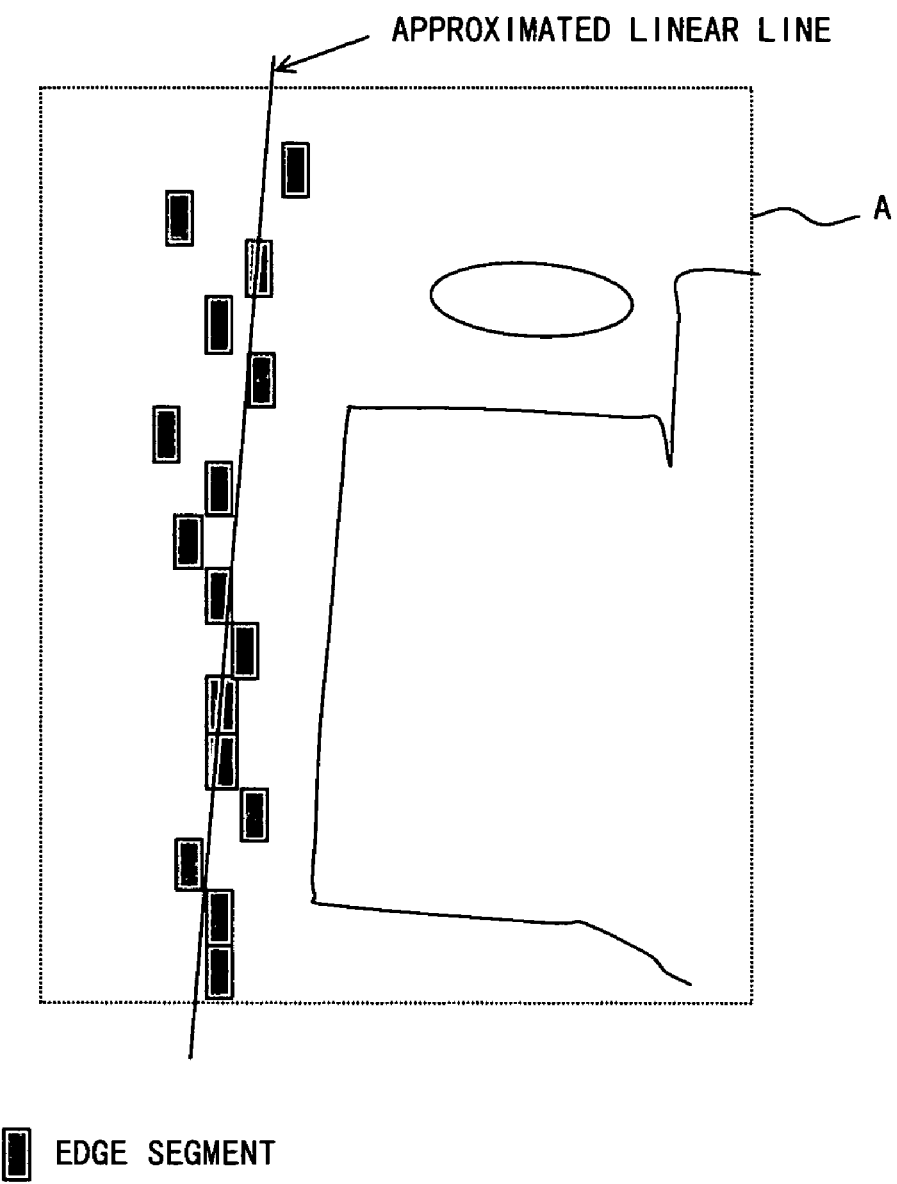
FIG. 9 exemplifies edge segments obtained with a tentative edge determination process (step 106) of FIG. 8.

Specifically, in step 106, the edge candidate determination process is executed by using the feature amounts obtained in step 104. Firstly, in step 210, a search direction is set from an end to the start of the printed character region, and a starting block is set. In step 220, as shown in FIG. 9, edge segments are obtained by searching all of lines in the search direction with the feature amounts of each block. Note that a portion corresponding to an edge, which is equivalent to the length of a search block detected with the search process, is referred to as an edge segment. Then, in a determination step 250, it is determined whether or not a search line whose edge segment is not detected exists. If a line whose edge segment cannot be detected exists, a search direction is set from the printed character region to the end (the left end because the detection of the left edge is exemplified in this example), and a starting block is set. Thereafter, the flow goes back to step 220 where the search is made for all of search lines from the left end of the printed character region toward the left side to detect edge segments. In this case, the search may be made from the center toward the left side. However, the search is made more efficient by excluding the printed character region. One implementation example of step 106 will be described later.

Figure 10:
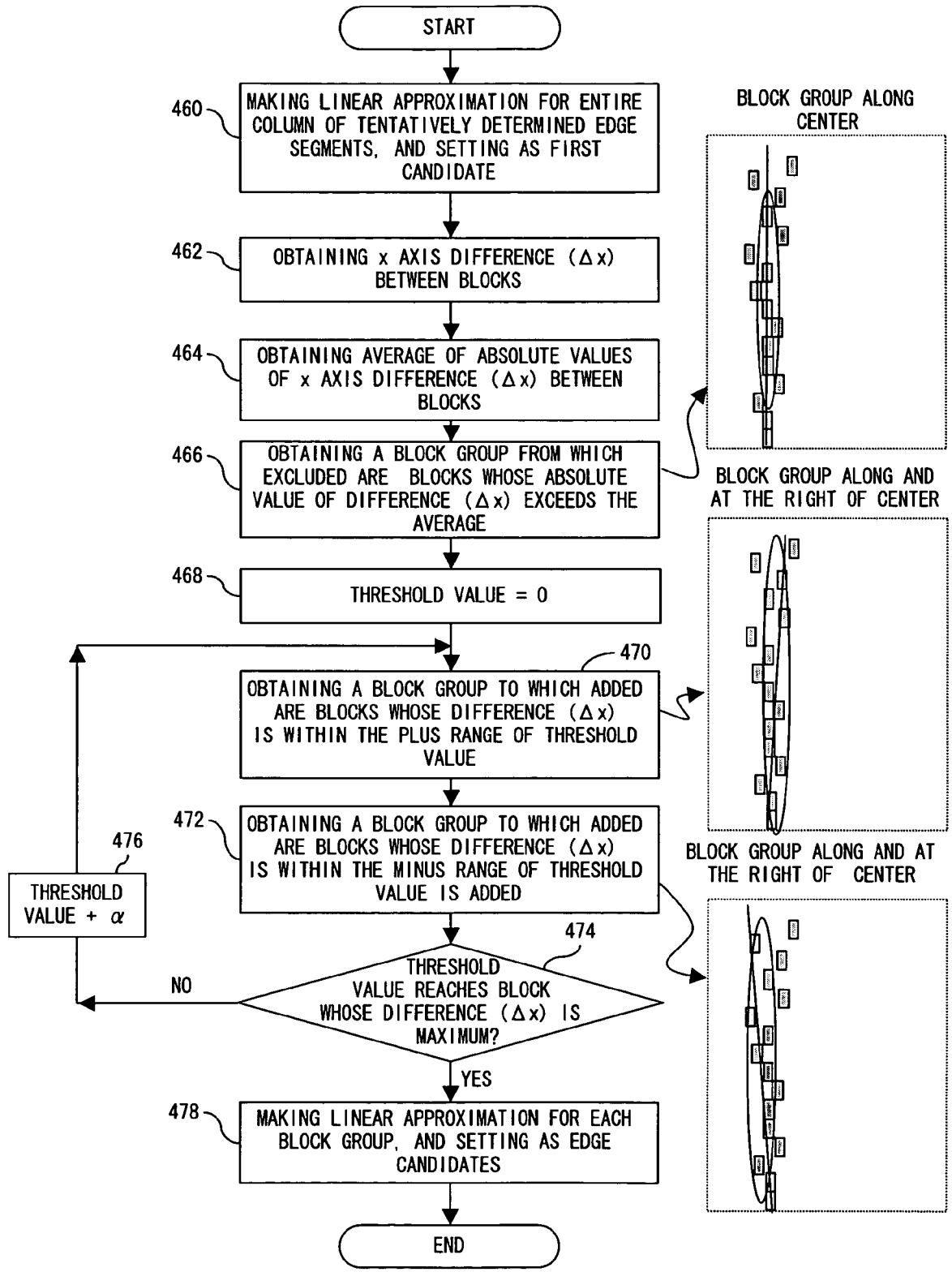
FIG. 10 is a flowchart showing the details of an example of a multiple edge candidates extraction process (step 108) of FIG. 1.

According to the present invention, a plurality of edge candidates are extracted from the edge segments of edge candidates obtained in step 106. Details of an example of this process are shown in FIG. 10. In this figure, firstly, in step 460, linear approximation is made for an entire column of the edge segments obtained in step 106, and the linear-approximated column is set as a first edge candidate. In step 462, an x axis difference Δx between blocks is obtained. Here, the "x axis difference Δx between blocks" indicates a difference between positions of adjacent edge segments in a search direction. Since the search direction is horizontal in the current example, this difference indicates a difference between positions (namely, x coordinates) of adjacent edge segments in the direction of the horizontal axis (namely, x axis). In step 464, an average of absolute values of the x axis difference Δx is obtained. In step 466, a block group (tentatively referred to as a "center-along block group") from which a block whose absolute value of the x axis difference Δx exceeds the average is excluded, namely, a set of edge segments relatively along the center in the column of the edge segments obtained in step 106 is obtained. In step 468, a threshold value is set to 0.

Next, in step 470, a block group (tentatively referred to as a center-along and right-close block group) resultant from adding a block group (namely, a set of edge segments close to the right), whose x axis difference Δx is within a plus range of the threshold value, to the center-along block group is obtained. In step 472, a block group (tentatively referred to as a center-along and left-close block group) resultant from adding a block group (namely, a set of edge segments close to the left), whose x axis difference Δx is within a minus range of the threshold value, to the center-along block group is obtained.

Then, in step 474, it is determined whether or not the threshold value reaches a block whose x axis difference Δx is the maximum. If the threshold value does not reach the block whose x axis difference Δx is the maximum, a predetermined threshold value increment α is added to the current threshold value, and the flow goes back to 470. Then, steps 470 to 476 are repeated. If the threshold value reaches the block whose x axis difference Δx is the maximum in step 474, then in step 478, linear approximation is respectively made for the obtained block groups, and the results are set as edge candidates. In this way, a plurality of edge candidates can be obtained. By setting the threshold value increment α to a suitable value, the number of edge candidates to be obtained can be adjusted.

After the plurality of edge candidates are extracted in this way, an edge candidate which is the most parallel to the ruled line obtained in step 102 is determined as a tentative edge. Namely, an edge candidate which is the most parallel to the ruled line (the ruled line in the vertical direction because the left edge is detected in this example) in the same direction as that of the edge currently being detected is determined as a tentative edge. If the edge currently being detected is a horizontal edge at the top or the bottom, an edge candidate which is the most parallel to the ruled line in the horizontal direction is determined as a tentative edge. FIG. 11 exemplifies a method selecting an edge candidate which is the most parallel to a ruled line from among a plurality of edge candidates in step 110. In FIG. 11A, a difference between the x coordinate of a point at which a horizontal axis passing through one end of the ruled line intersects each edge candidate and the x coordinate of the above described one end is defined as ΔT, whereas a difference between the x coordinate of a point at which a horizontal axis passing through the other end of the ruled line intersects the above described edge candidate and the x coordinate of the above described other end is defined as ΔB. Operations are described next with reference to a flowchart shown in FIG. 11B. In step 482, the difference ΔT between the top of the ruled line and each edge candidate in the horizontal direction, and the difference ΔB between the bottom of the ruled line and each edge candidate are obtained. In step 484, an edge candidate whose differences from ΔT and ΔB are minimum is selected, and determined as a tentative edge. In the example shown in FIG. 11A, the edge candidate 2 is selected because its differences from ΔT and ΔB are smaller.

The edge detection process may be terminated by determining the edge selected in step 110 as a final edge. In this preferred embodiment, however, to improve the edge detection accuracy, the edge obtained here is set as a tentative edge, and edge detection with higher accuracy (a block to be processed is made smaller) is made in the vicinity of the tentative edge to screen an accurate edge position in the succeeding step.

Figure 12:
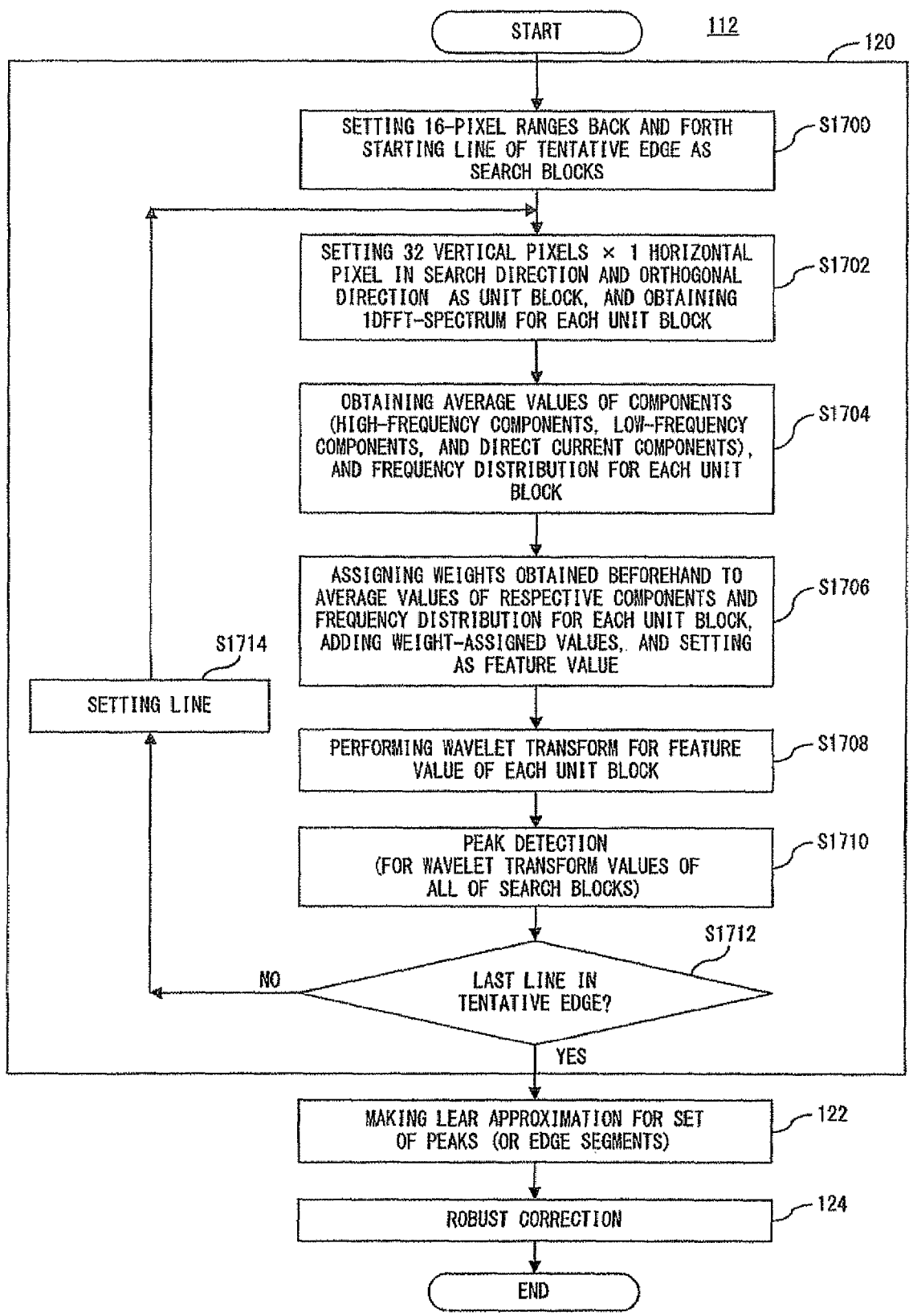
FIG. 12 is a flowchart showing the details of an example of an edge determination process (step 112) of FIG. 1.
Figure 13:
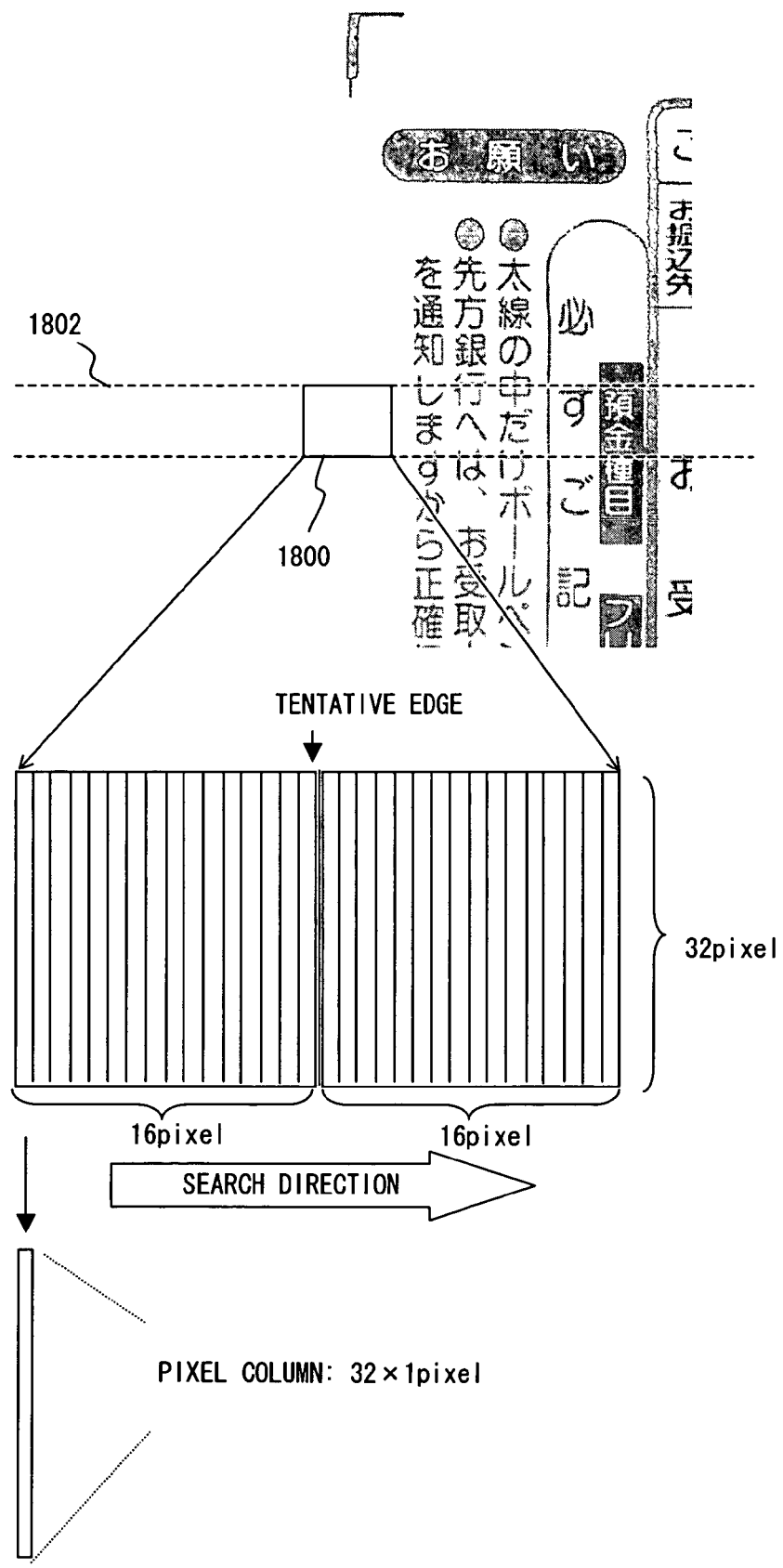
FIG. 13 shows a pixel region to be processed in step 120 of FIG. 15.

Namely, in step 112, the final edge is determined based on the tentative edge obtained in step 110. Details of step 112 are shown in FIG. 12. In step 120, features are extracted in the unit of a block of 32 vertical pixels×1 horizontal pixel over 16-pixel widths at the left and the right of the tentative edge obtained in step 110 as shown in FIG. 13, and a peak position based on the extracted features is determined as an edge segment. In step 122, linear approximation is made for obtained edge segments to obtain a linear line. Then, in a robust correction in step 124, linear approximation is made for an edge set obtained by excluding an edge, which is unsuitable for being determined as an edge (an edge too apart from the linear line obtained in step 122), from the set of edge segments obtained in step 120 by using the linear line obtained in step 122 as a reference, so that the final edge is obtained. Details of step 120 will be described later.

As described above, in the preferred embodiment of FIG. 1, an edge is obtained by determining edge candidates with a search made in the unit of a large block of 32 vertical pixels×4 horizontal pixels in step 106, and by increasing the accuracy with a search made in the vicinity of a tentatively determined edge in the unit of a small block of 32 vertical pixels×1 horizontal pixel in step 112. However, the present invention is not adaptable only to the method detecting an edge in two stages by changing a block size in this way. The latter half of the edge detection with a search made in the unit of a small block is omissible. For example, step 112 may be omitted, and the edge detection process shown in FIG. 1 may be terminated after step 110 is executed.

In summary, the principle of the present invention is (1) to detect edge segments by inversely searching lines from the vicinity of a center (preferably, an end of a printed character region) to an end if a line whose edge segment cannot be detected exists as a result of searching the lines from the end of a captured image with the use of a difference between materials, and (2) to select as an edge an edge candidate, which is the most parallel to a ruled line extracted beforehand, from among edge candidates after determining the plurality of linear edge candidates from columns of obtained edge segments. In the above described preferred embodiment, the tentative edges are obtained with the large block (with relatively low accuracy) in steps 104 and 106, and the final edge is obtained with the small block (with higher accuracy) in the vicinity of the tentative edge in step 112. However, the present invention is not limited to the method obtaining an edge in two stages in this way. Any method is applicable as an edge detection method as far as it obtains an edge by searching lines from an end of a captured image. Accordingly, steps 100, 104, 220, and 112 may be implemented with any method as far as it meets the purpose. As described above, step 112 is omissible.

Here, implementation examples of steps 100, 104, 106, and 112 are described in detail. These steps may be implemented as any forms without being limited to the following examples, as long as they meet the purposes.

<Printed Character Region Exclusion>

Figure 4:
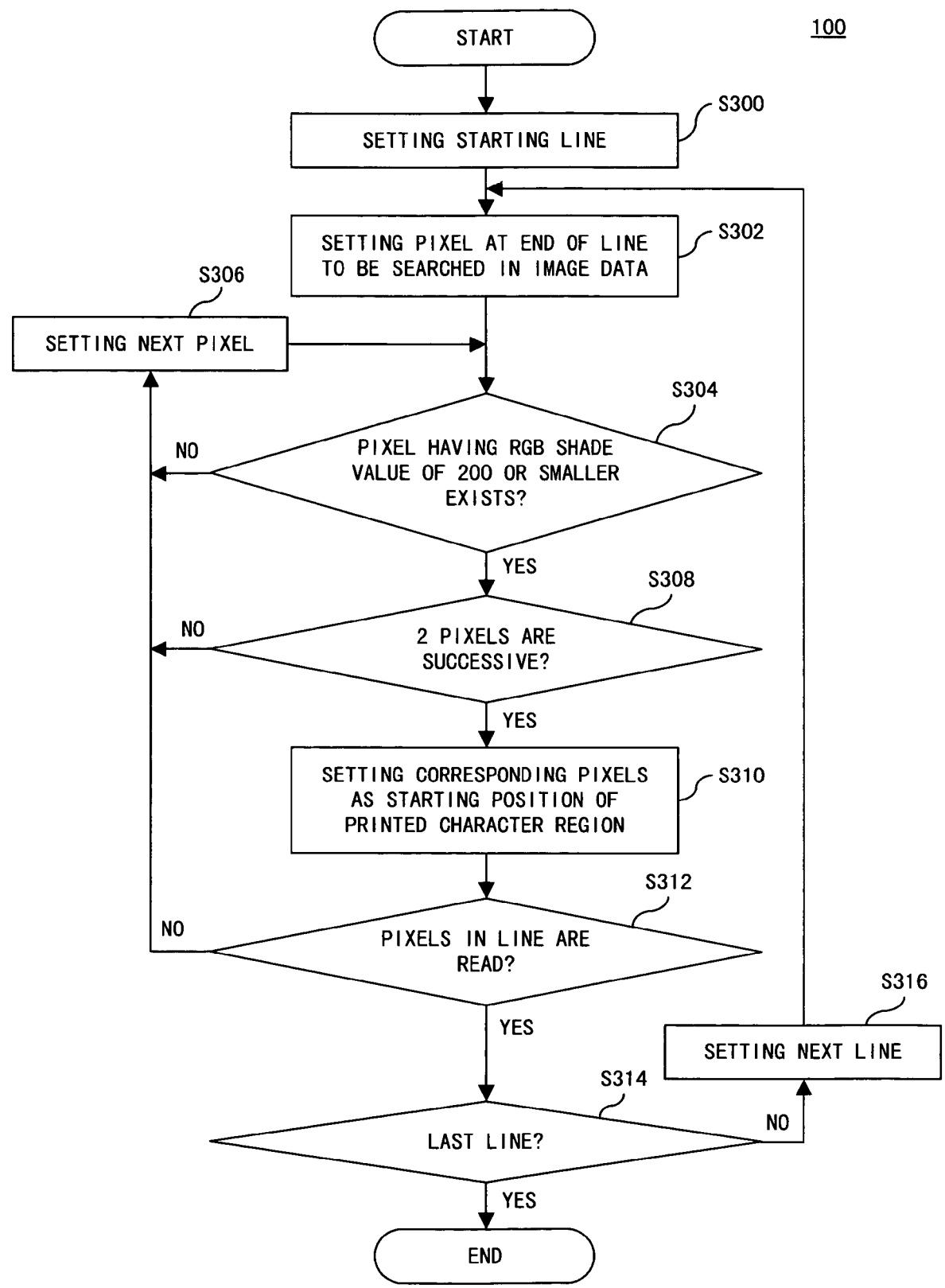
FIG. 4 is a flowchart showing the details of an example of a process in step 100 of FIG. 1.
Figure 5B:
FIGS. 5A and 5B show the exclusion of a printed character region, which is made with a printed character region exclusion process shown in FIG. 1.
Figure 5A:
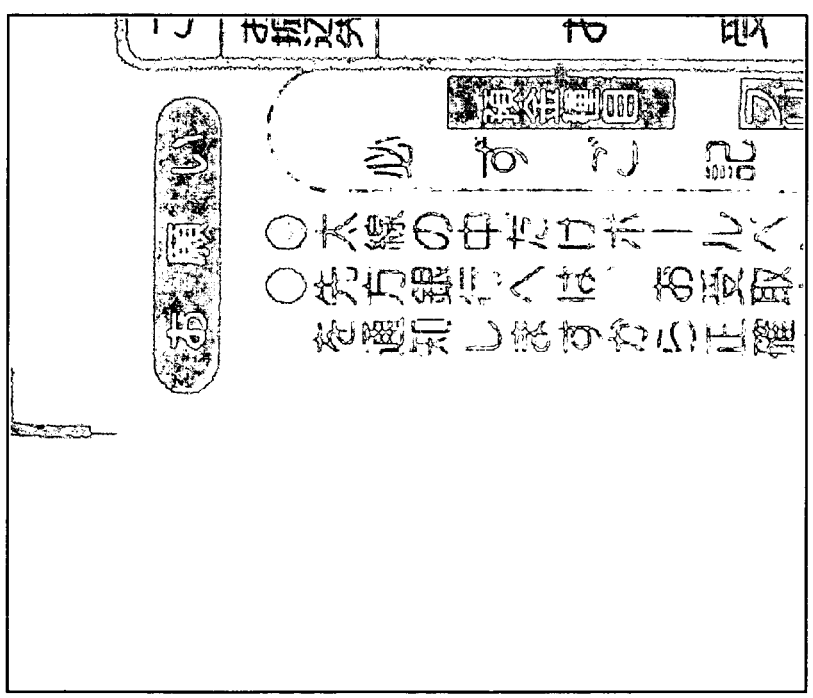

In the operational flow shown in FIG. 4, the position of a starting line to be firstly read in the framed source document image A shown in FIG. 3 on an image plane is set to the position at the top of the image A (S300). Then, a pixel positioned at the left end of the set line in FIG. 3 is set as a read target (S302). Here, the RGB shade values of the set pixel are read, and it is determined whether or not the read values exceed an RGB shade value 200, which is predetermined and is a reference for excluding a pixel as a printed character region in this example (S304). The RGB value, which is the reference of this determination, may be suitably set depending on a source document. If the RGB values of the read pixel exceed 200, the pixel is determined not to be the printed character region, and the next pixel at the right in the same line is set as the next read target (S306). Or, if the RGB values of the read pixel are equal to or smaller than 200 in step S304, the printed character region is tentatively assumed to exist in this region, and the flow transfers to a noise determination process in the succeeding step S308. In step S308, it is determined whether or not a pixel whose position is successive to the pixel tentatively assumed as the printed character region in step S304 on the image plane, and which is tentatively assumed as the printed character region exists. If it is determined in step S308 that the successive pixel does not exist, the flow transfers to the process in step S306, and the next pixel at the right of the pixel currently being processed in the same line is set as a read target, and the processes in and after step S306 are executed.

If two successive pixels are not tentatively assumed as the printed character region, it means that these pixels are noise due to a stain, etc., which is not associated with the printed character region, with great probability. Setting of the number of successive pixels, which is a reference of this determination, can be suitably made on demand. If successive pixels are determined to exist in step S308, the pixels are set as the printed character region initially detected from the left end of the image A shown in FIG. 3 (step S310). Then, in step S312, it is determined whether or not a pixel yet to be processed in this line is left. If it is determined in step S312 that a pixel yet to be processed in this line is left, the flow goes to a process in step S306, and the pixel is similarly processed in the above described steps. If it is determined in step S312 that a pixel yet to be processed in this line is not left, it is further determined whether or not this line is the last line to be read at the bottom of the image A shown in FIG. 3 (step S314). If it is determined in step S314 that this line is not the last line, a line immediately below this line on the image plane is set (step S316), and the processes in and after step S302 are repeatedly executed from the left end of the set line. Upon completion of scanning all of lines in the image A shown in FIG. 3, namely, upon completion of scanning up to the above described last line, the current line is determined to be the last line, and this process is terminated.

<Feature Emphasis>

In the feature emphasis step 104 and the edge segment detection step 220, the search region of the image A (the image from which the printed character region is excluded) is partitioned into relatively large pixel blocks, such as blocks of 32 vertical pixels×4 horizontal pixels, and the processes are executed for each of the blocks.

Figure 6:
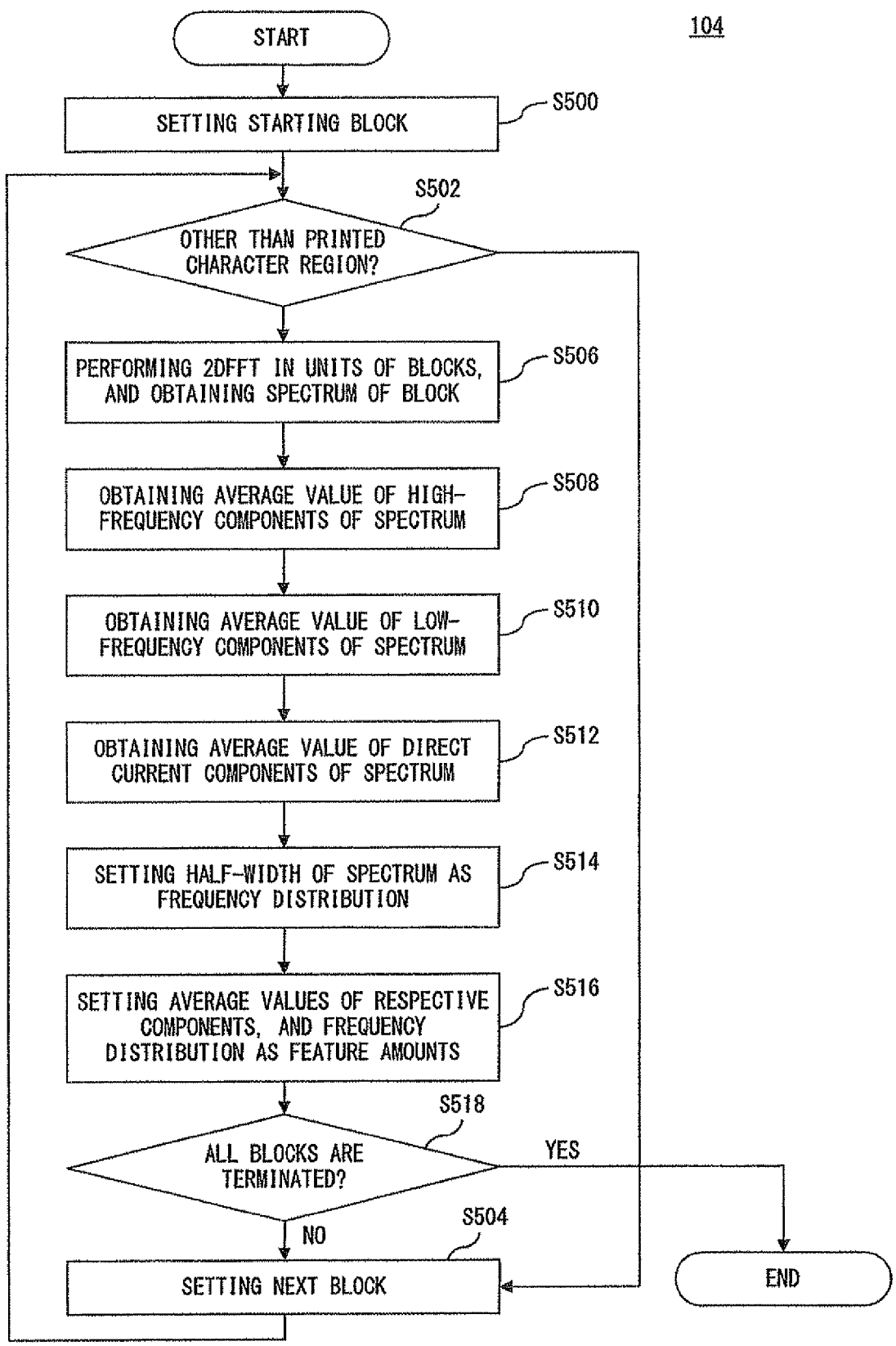
FIG. 6 is a flowchart showing the details of an example of a feature emphasis process in step 104 of FIG. 1.

In the operational flow shown in FIG. 6, a block at the left end of the top of the image A is firstly set as a starting block (step S500). Then, it is determined whether or not the current block includes the printed character region shown in FIG. 5 based on information in FIG. 3, which indicates the printed character region of the pixel identified in the printed character region exclusion step 100 of FIG. 1 (step S502) If it is determined in step S502 that the current block includes the printed character region in FIG. 4, a block next to the current block is reset as a region to be processed in the image A (step S504). If it is determined in step S502 that the current block does not include the printed character region in FIG. 4, a known two-dimensional fast Fourier transform process (hereinafter abbreviated to 2DFFT) is executed for the current block in units of blocks, and the spectrum of the current block is obtained (step S506). Here, an average value of high-frequency components (assumed to be $\frac{1}{2}\pi \leq \omega < \frac{3}{4}\pi$. $\omega$ is a variable indicating a frequency) of the obtained spectrum of the current block is obtained (step S508).

Then, an average value of low-frequency components (assumed to be $0 < \omega < \frac{1}{2}\pi$ in this example) of the obtained spectrum of the current block is obtained (step S510). Next, an average value of direct current components (assumed to be $\omega=0$ in this example) of the obtained spectrum of the current block is obtained (step S512). FIG. 7 exemplifies actual measurement data of the average values of the above described components obtained for each block in a rectangular region of 32 vertical pixels×212 horizontal pixels thus searched. This actual measurement data indicates calculation results respectively for RGB to facilitate the understanding of fluctuations in the respective values of RGB. X coordinate in this figure corresponds to the direction of the X axis of the image A shown in FIG. 3, and indicates a value of the number of pixels when the number of pixels is counted in the right direction by recognizing the left end of the rectangular region shown in FIG. 3 as the origin of the X coordinate. FIG. 7 further indicates shade values as direct current components (direct current components R, G, and B) of the respective RGB, spectrum values as low-frequency components (low-frequency components R, G, and B) of the respective RGB, and spectrum values as high-frequency components (high-frequency component R, G, and B) of the respective RGB in correspondence with the position which is a position according to the number of pixels from the left end of the rectangular region shown in FIG. 3 and specified by the X coordinate. In the above described step, the average values of the three types of the components are obtained. Here, a half-width is further obtained from the spectrum of the current block, and the obtained half-width is set as the frequency distribution of the current block (step S514). The half-width is an interval of two cycles in the vicinity of a peak cycle, which indicates the intensity of half of the peak value in a frequency distribution obtained when horizontal and vertical axes are respectively defined as a cycle and the intensity of a spectrum. The average values of the respective components, which are obtained in steps S508 to S512, and the frequency distribution set in step S514 are set as the feature amounts of the current block (step S516). Here, it is determined whether or not the above described processes have been executed for all of blocks of the framed source document image A shown in FIG. 3 (step S518). If it is determined in step S518 that a block to be scanned next to the current block exists, the flow goes to step S504, in which the block to be scanned next in the image A shown in FIG. 3 is reset as a region to be processed, and the above described processes are executed. If it is determined in step S518 that the above described processes have been executed for all of the blocks of the image A, and a block to be scanned next to the current block does not exist, this process is terminated. The 4 feature amounts are obtained in this operational flow. However, the feature amounts are not limited to these 4 amounts, and an additional feature amount may be added. As described above, in the feature emphasis step 104 of FIG. 1, the various types of feature amounts in units of blocks of a predetermined size can be extracted from the framed source document image A for which the process is executed in the printed character region exclusion step 100.

<Edge Candidate Determination>

Figure 8:
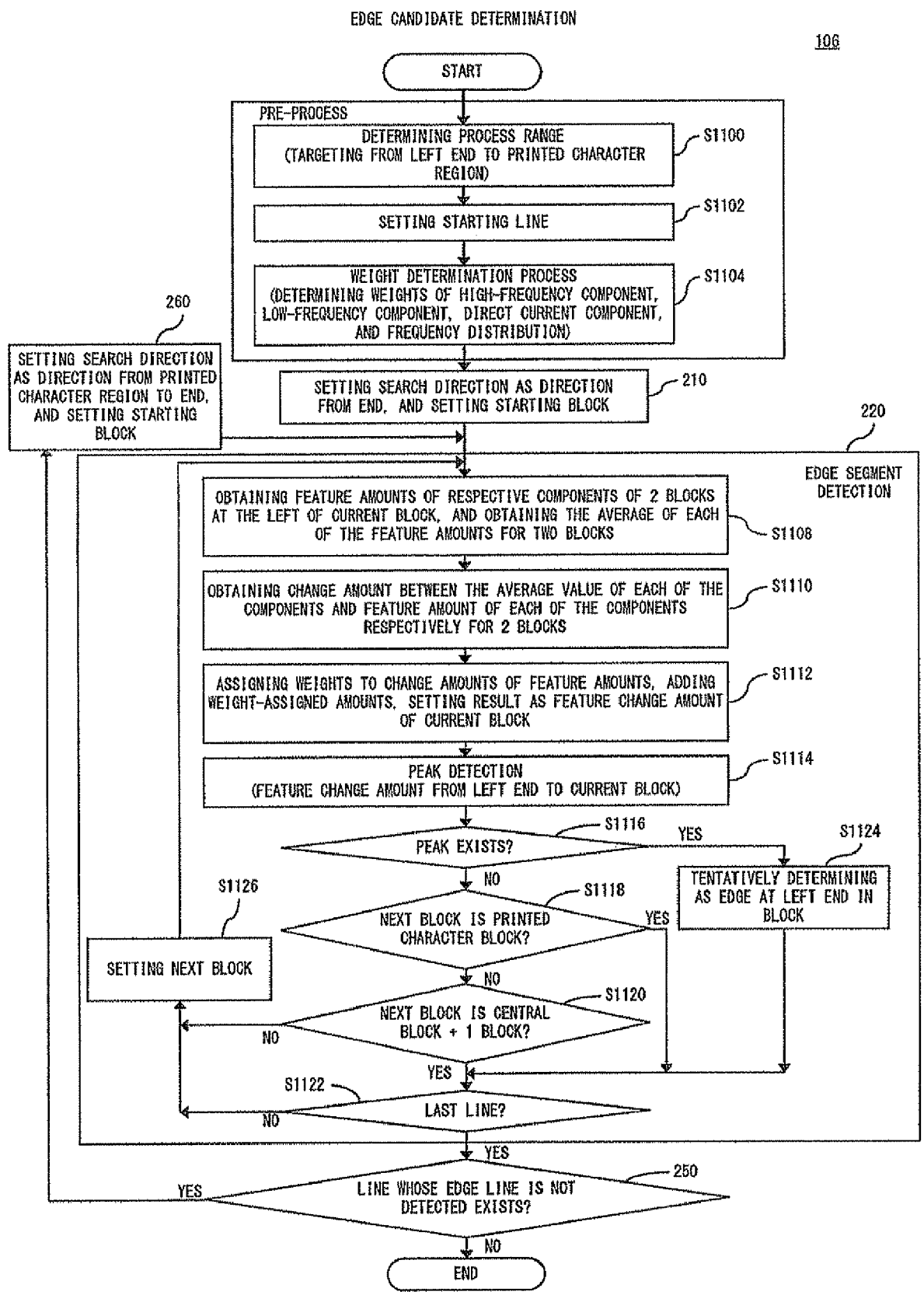
FIG. 8 is a flowchart showing the details an example of a process for obtaining edge segments of an edge candidate in step 106 of FIG. 1.

FIG. 8 is a flowchart showing one implementation example of the process for obtaining edge segments of an edge candidate in the edge candidate determination step 106 of FIG. 1. This operational flow is executed based on the various types of feature amounts obtained in the feature emphasis step 104 of FIG. 1.

In this operational flow, a process target range of the image is first determined in units of blocks of 32 vertical pixels ×4 horizontal pixels, into which the region of the image A shown in FIG. 3 is partitioned, and a corresponding process range is set (step S1100). Determination of a process range in this example is made by recognizing from the left end of the image A, where the printed character region is made black in FIG. 5B, to the printed character region as a process target range. When the process range is determined in this way, a line at the top of the image A is set as a starting line from which a block is to be read (step S1102). Here, a process for determining weights of the above described various types of feature amounts, which will be described in detail later, is executed (step S1104). Then, in step 210, a search direction is set from the end to the printed character region, and the block at the left end of the top of the image A is set as a starting block. Then, an average of each of the feature amounts obtained in step 104 is obtained for blocks successive and adjacent to the current block on the left (up to two blocks which are adjacent and successive to the current block at the left) (step S1108). Then, the average of each of the feature amounts thus obtained is used for the process (step S1110) shown in FIG. 8. In step S1110 of FIG. 8, a change amount of each of the feature amounts between each of the feature amounts of the block currently being processed and the average of each of the feature amounts obtained in step S1108 is obtained.

Change amounts of the respective feature amounts thus obtained are respectively assigned weights of the feature amounts, which are obtained with the weight determination process in step S1104 or statistically obtained beforehand (desirably, the weights of a high-frequency component, a low-frequency component, a direct current component 1, and a frequency distribution are respectively set to 1, 2, 1, and 1), the weight-assigned amounts are added, and the added value is set as the feature change amount of the current block (step S1112). Here, a process for obtaining the peak of the feature change amount set for each block in step S1112 is executed (step S1114). The process for obtaining a peak (peak detection process) referred to here will be described in detail later. Then, the peak determination of the feature change amount of the current block based on the above described peak detection process is made (step S1116). If it is determined in step S1116 that a peak does not exist, it is further determined whether or not a block to be scanned next is the printed character region (step S1118). If it is determined in step S1118 that the block to be scanned next is not the printed character region, it is further determined whether or not the block is a block apart from the central block by 1 block on the side of the scanning direction (step S1120). If it is determined in step S1120 that the block is located 1 block away from the central block on the side of the scanning direction, it is determined whether or not the block currently being processed is a block positioned in the last line (step S1122). Or, if it is determined in step S1116 that a peak exists, it is determined that the block currently being processed is a block corresponding to the edge, and this block is tentatively determined as an edge at the left end of the source document image in this example (step S1124). Then, the flow goes to the above described process in step S1122. If it is determined in step S1118 that the block currently being processed is the printed character region, the flow goes to the process in step S1122.

If it is determined in step S1120 that the block is not the block apart from the central block by 1 block on the side of the scanning direction, the flow goes to a process in step S1126, and a block to be scanned next is set as a block to be processed. Then, the processes in and after step S1108 are repeatedly executed. If it is determined in step S1122 that the block currently being processed is not a block positioned in the last line, the flow goes to the process in step S1126. Then, the processes in and after step S1126 are executed. Or, if it is determined in step S1122 that the block currently being processed is a block positioned in the last line, the flow goes to a process in the succeeding step 250. In step 250, it is determined whether or not a line whose edge segment cannot be detected exists. If a line whose edge segment cannot be detected exists, a search direction is set from the printed character region to the end of the image A, and a starting block is set in step 260. Then, the flow goes back to step S1108. If it is determined in step 250 that a line whose edge segment cannot be detected does not exist, this edge candidate determination process is terminated.

<Step 120 (Edge Detection with High Accuracy)>

In this operational step, 16-pixel ranges respectively positioned back and forth of a pixel column in FIG. 9 (32 vertical pixels×1 horizontal pixel), which is tentatively set as an edge position in a line at the top of the image A, in a scanning direction are first set as a process target (step S1700). Then, a unit of a block in this process is set as a pixel column having a range of 32 vertical pixels×1 horizontal pixel. One-dimensional fast Fourier transform is performed for the above described range in this unit of a pixel column, and a spectrum of each pixel column is obtained (step S1702). FIG. 13 shows a range of the process target for one line. This figure shows a process target range for one line, which includes the linear-approximated pixel column shown in FIG. 9. A rectangular region 1800 shown in FIG. 13 becomes the process target range of a line 1802 indicated by broken lines. A process target range is also set for other lines in a similar manner, although this is not particularly shown. In an enlarged portion of the rectangular region 1800, a position relationship between an edge tentatively determined as an edge position and the above described range of the process target is shown. It is proved from this figure that pixel columns (each of which is 32 vertical pixels×1 horizontal pixel) respectively arranged in 16 bits back and forth of the tentative edge indicated by a linear line in the center of this figure are determined as the above described range of the process target. After a spectrum is obtained in step S1702, average values of the components (high-frequency, low-frequency, and direct current components), and a frequency distribution of the spectrum are obtained in the above described unit of the pixel column (step S1704). Then, the components and the frequency distribution are assigned weights, which are obtained in step S1104 of FIG. 8 or statistically obtained beforehand, weight-assigned values are added for each of the pixel columns, and the obtained value is set as a feature value of the pixel column (step S1706). Here, a known wavelet transform is performed for the feature value for each of the pixel columns (step S1708).

Next, a known peak detection process is executed to detect an edge segment in units of lines by using the value obtained with the wavelet transform (step S1710). Then, it is determined whether or not the line currently being processed is the last line specified as a tentative edge (step S1712). If the line currently being processed is not the last line, a line to be scanned next is set (step S1714), and the processes in and after step S1702 are repeated. If it is determined in step S1712 that the line currently being processed is the last line, the process in step 120 is terminated.

<Detection of a Boundary Composed of 4 Sides

Figure 14:
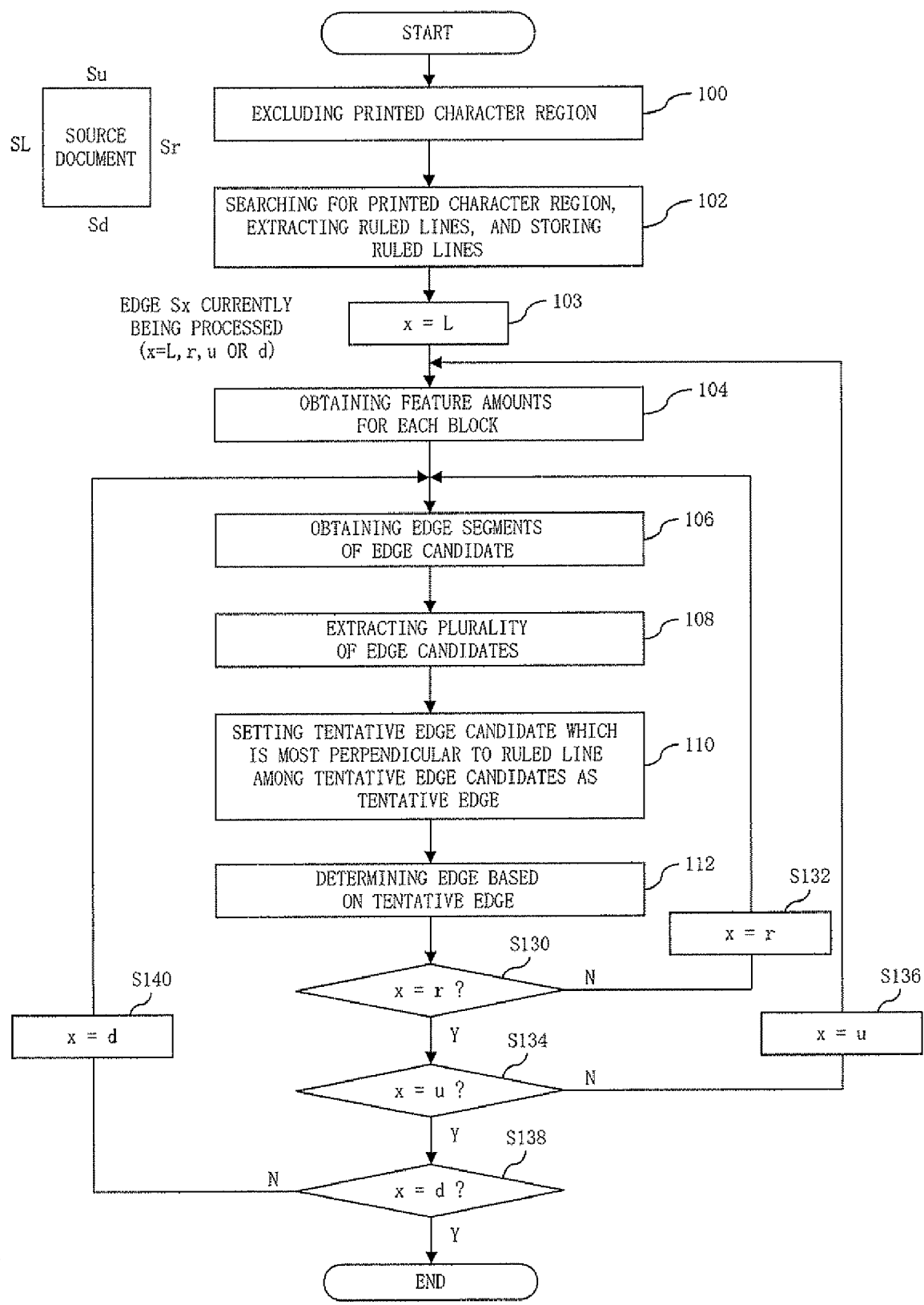
FIG. 14 is a flowchart showing operations for extracting a source document with edge detection principle of the present invention shown in FIG. 1.

As described above, an edge of a source document can be obtained with high accuracy. A case where a source document is extracted from a captured image by obtaining all of edges of the source document is described based on the above provided explanation. FIG. 14 is a flowchart showing operations for extracting a source document according to the edge detection principle of the present invention shown in FIG. 1. Here, assume that the left, the right, the top, and the bottom edges of a source document are respectively SL, Sr, Su, and Sd. Also assume that an edge currently being processed among the 4 edges is Sx (x=L, r, u, or d). Since main process steps in FIG. 14 are already described, the flow of the process is mainly referred to here.

In FIG. 14, results of the processes in steps 100 and 102 can be used for the subsequent search process regardless of a direction. Therefore, it is sufficient to execute these processes once at the beginning. In step 103, L indicating the left edge is set as x of the edge Sx currently being detected.

Next, in step 104, feature amounts are obtained for each block, and the feature emphasis is made. In this process, a vertically oriented block is used. Therefore, step 104 must be executed respectively for the left and the right edges, and the top and the bottom edges. Subsequent steps 106 to 112 must be executed for the respective edges.

Accordingly, upon termination of step 112, it is determined in step S130 whether or not x is r. If x is not r, x is set to r indicating the right edge in step S132. Then, the flow goes back to step 106, and the right edge is detected.

If x is r in the determination step S130, it means that the detection of the right edge is terminated. Therefore, it is determined in a determination step S134 whether or not x is u indicating the top edge. If x is not u, detection of the top edge is not terminated. Therefore, x is set to u in step S136, and the flow goes back to step 104. After feature amounts of each block are obtained for the search in the upward and downward directions, the top edge is detected.

If x is u in the determination step S134, it means that the detection of the top edge is terminated. Therefore, it is determined in a determination step S138 whether or not x is d indicating the bottom edge. If x is not d, detection of the bottom edge is not terminated. Therefore, x is set to d in step S140, and the flow goes back to step 106 to detect the bottom edge. If x is d in the determination step S138, it means that also the detection of the bottom edge is terminated. Therefore, the source document extraction process is terminated.

Figure 15:
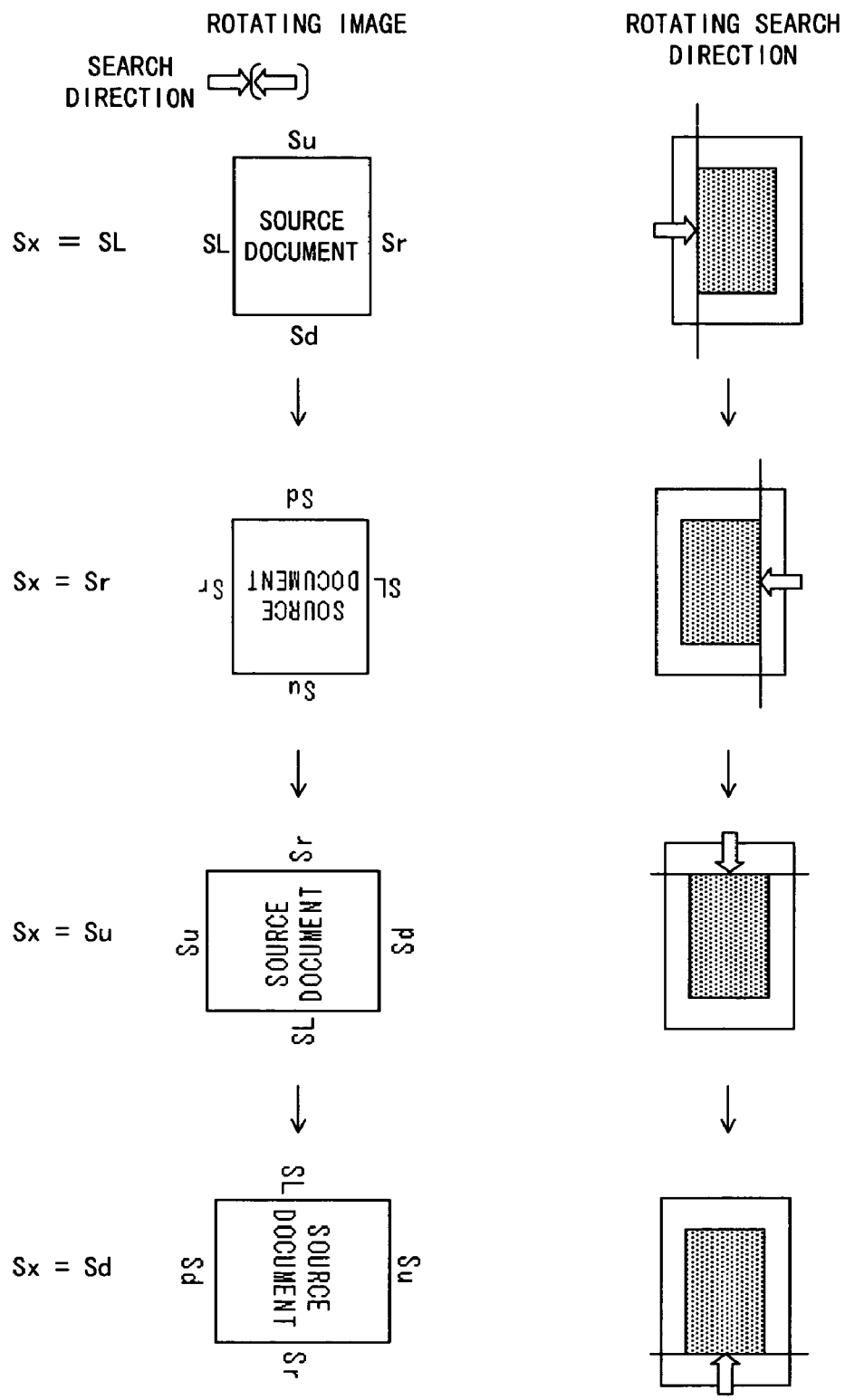
FIG. 15 shows two types of search methods when 4 edges of a source document are detected in FIG. 14.

FIG. 15 shows two types of search methods when the 4 edges of a source document are detected in FIG. 14. One method is a method detecting 4 edges by fixing a search direction, and by sequentially rotating a source document (the left side in this figure). The other method is a method detecting 4 edges by fixing the orientation of an image, and by sequentially rotating a search direction. In either case, according to the present invention, a search is made from the printed character region toward the end if a line whose edge segment cannot be detected exists as a result of searching all of search lines from an outside toward the printed character region, as indicated by step 106 (FIGS. 1 and 12) and step 220. In this way, the accuracy of the edge detection can be improved.

<Various Modifications>

Figure 16:
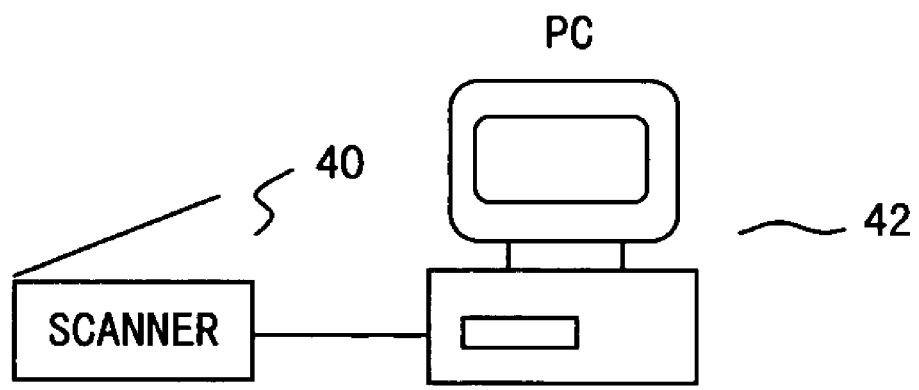
FIG. 16 is a simplified block diagram showing an example for loading a boundary extracting program according to the present invention into a computer, and for executing the program.

FIG. 16 is a simplified block diagram showing an embodiment in which a boundary extracting program according to an implementation mode of the present invention is loaded into a computer and executed. A system shown in this figure comprises a scanner 40 capturing a source document, and a computer 42 that can store and execute the edge or boundary extracting program 36 according to the present invention. A portion of a source document included in an image captured with the scanner 40 is extracted with the boundary extracting program 36 stored in the computer 42, and used.

Figure 17:
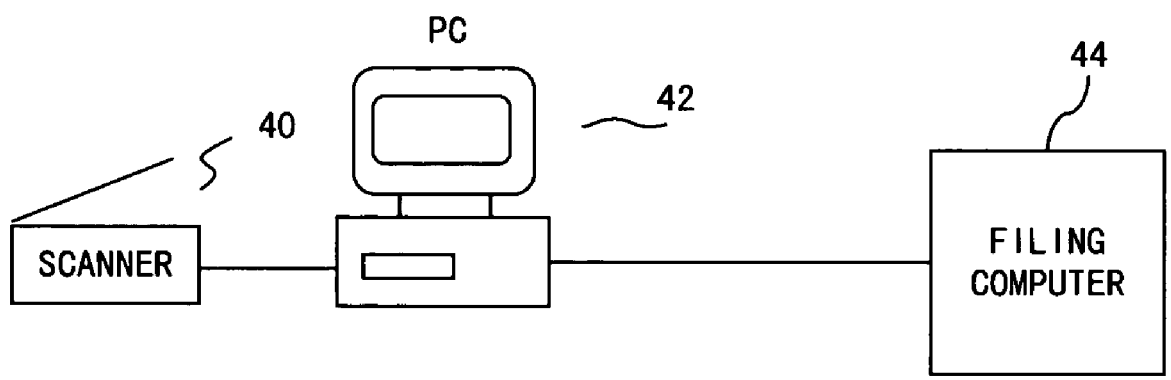
FIG. 17 is a simplified block diagram showing a second implementation example for loading the boundary extracting program according to the present invention into a computer, and for executing the program.

FIG. 17 is a simplified block diagram showing a second implementation example for loading the boundary extracting program according to the preferred embodiment of the present invention into a computer, and for executing the program. The system shown in FIG. 17 is the same as that shown in FIG. 16 except that a filing computer 44 connected to be able to communicate with a computer 42 is further comprised. After the computer 42 shown in FIG. 17 extracts a source document from an image captured from a scanner 40 according to the program 36, it may transmit the extracted source document to another device, such as the filing computer 44 without using the document for itself. In this case, the computer 42 may extract a background portion from the image, adjust the size of the source document, or correct obliqueness by rotating the image of the source document based on information obtained during the edge detection before transmitting the source document.

Figure 18:
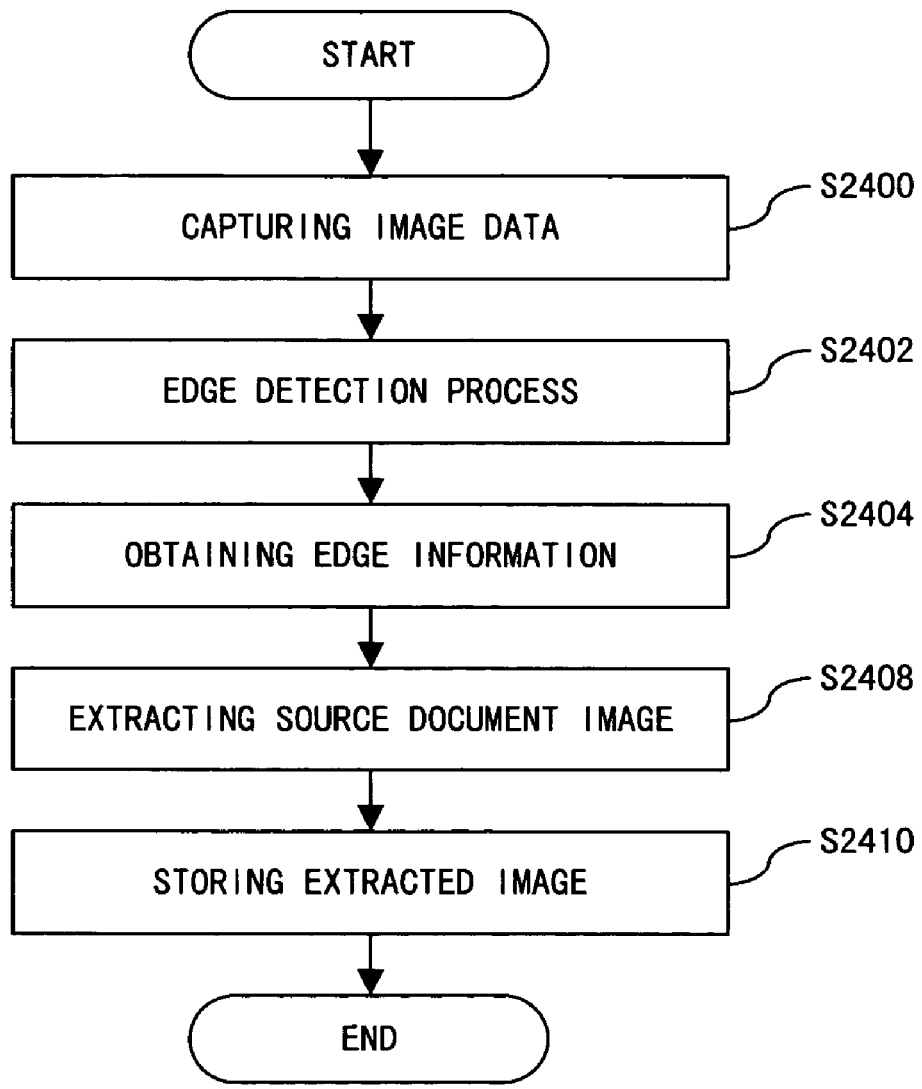
FIG. 18 is a flowchart exemplifying operations of a first image handling system using the boundary extracting program according to the present invention.

FIG. 18 is a flowchart exemplifying the operations of an image handling system using the boundary extracting program according to the preferred embodiment of the present invention. Firstly, image data read from the scanner 40 is captured (step S2400). Then, the process for detecting an edge of a source document is executed for the image data according to the boundary extracting program 36 (step S2402), and edge information of the source document is obtained (S2404). Then, only an image region (source document image) enclosed by 4 edges is extracted (S2408). Then, the source document image thus extracted is recorded (step S2410).

Figure 19:
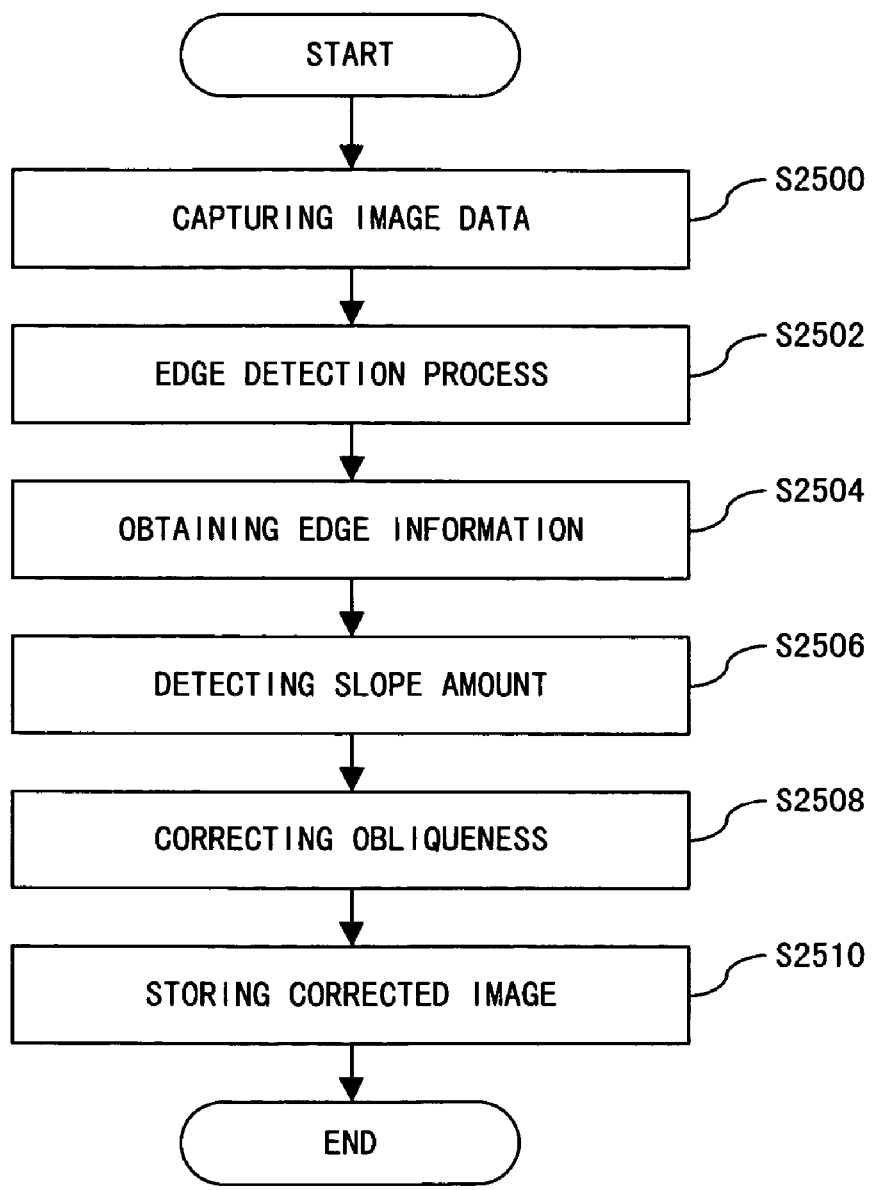
FIG. 19 is a flowchart exemplifying operations of a second image handling system using the boundary extracting program according to the present invention.

FIG. 19 is a flowchart exemplifying the operations of a second image handling system using the boundary extracting program according to the preferred embodiment of the present invention. Firstly, image data read from the scanner 40 is captured into the computer 42 (step S2500). Then, the edge detection process is executed according to the above described boundary extracting program 36 (step S2502). Then, edge information of the source document is obtained (step S2504). Here, as editing of image data, for example, a minimum slope of the obtained edge against an axis (X or Y axis) on the image plane is detected (step S2506), and the obliqueness of the image is corrected to eliminate the slope by rotating the image data (step S2508). Then, the image of the source document thus corrected is recorded to an image data storing unit (step S2510).

Note that the operational flows shown in FIGS. 18 and 19 can be combined. For example, the processes in steps S2506 and S2508 of FIG. 19 can be executed between the processes in steps S2404 and S2408 of FIG. 18. Making an obliqueness correction in this way can facilitate the execution of a post-process. Furthermore, background image data is cut off, whereby extra data can be removed, and also a data amount required is made smaller. This leads to a reduction in the amount of data stored, and to an increase in the processing speed in data use.

FIG. 20 is a flowchart exemplifying the operations of a system extracting a source document from a captured image with the boundary extracting program according to the preferred embodiment of the present invention, and making character recognition. Firstly, image data read from the scanner 40 is captured (step S2700). Then, the edge detection process is executed for the image data according to the boundary extracting program 36 (step S2702), and edge information of the source document is obtained (step S2704). Furthermore, an image region other than an image region enclosed by 4 edges is determined in the image data (step S2706). The shade levels of the determined image region other than the image region (source document image) enclosed by the 4 edges are changed to black (step S2708). Lastly, a character recognition process for identifying a starting point (for example, a position at the left end of the top of the source document image on the image plane), for extracting the image by targeting, for example, a printed character position from the starting point, which is prestored in a storing unit, etc., for analyzing the extracted image, and for extracting a character included in the image based on a pattern recognition process is executed (step S2710).

Note that this process can be combined with the operational flow shown in FIG. 19. For example, the processes in steps S2506 and S2508 of FIG. 19 can be executed between steps S2704 and S2706 of FIG. 20. A background image is changed to black in this way, whereby image data which has the same specifications as those of a conventional image which is captured from a conventional scanner implementing a black background, and in which a black background image exists in the periphery of the frame of a source document image, can be created. As a result, a device (such as an OCR processing device, etc.) editing image data having a conventional black background is also allowed to use image data obtained via the image processing device according to the present invention.

The above described implementation examples are mere implementation examples cited to explain the present invention. Accordingly, a person having ordinary skill in the art can make various changes, modifications, or additions to the above described implementation examples according to the concept or the principle of the present invention.

For example, the above described processes (including the edge detection process as a matter of course) can be distributed in the form of a program. In this case, the program can be stored onto a storage medium such as a floppy disk (registered trademark), a CD-ROM, a DVD, etc., and distributed. Or, part or the whole of the program can be distributed via a transmission medium used by a public network, etc.

According to the present invention, if a line whose edge segment cannot be detected exists, a search is made in all of search lines from the vicinity of the center of an image to an end of the image, whereby the accuracy of detection increases.

Furthermore, according to the present invention, a plurality of edge candidates are obtained from edge segments for all of search lines, and an optimum candidate is selected from among the plurality of edge candidates, thereby further improving the accuracy of detection.

What is claimed is:

1. A boundary detecting method detecting one edge configuring a boundary of a source document by using a difference between materials in an image obtained by capturing the source document with a scanner, comprising:

a step of detecting edge segments by searching all of the search lines in the image from an extremity of the image in a direction perpendicular to the top, bottom, left or right edge to be detected by a computer;

a step of extracting a ruled line from the source document in the image by the computer;

a step of detecting edge segments by searching all of the search lines from a vicinity of a center of the image toward the extremity of the image by the computer, if a line whose edge segment cannot be detected exists; and a step of determining a line approximating the top, bottom, left or right edge from the edge segments detected for all of the search lines by the computer, wherein each search line comprises a plurality of search blocks;

each search block is more than one pixel high and more than one pixel wide;

the search block corresponding to a portion of the edge to be detected is detected as the edge segment;

each of the edge segments is defined by a length of a search block image portion corresponding to an edge, as detected in the searching of the search lines;

said step of determining a line comprises a candidate determining step of obtaining a plurality of edge candidates from the edge segments for all of the search lines, and a selecting step of selecting an optimum candidate from among the plurality of edge candidates on a basis of a difference between first and second differences between each of the plurality of edge candidates and the ruled line, wherein the first and second differences regarding one of the plurality of edge candidates are defined as a length of an axis from a first or second end of the ruled line to the one of the plurality of edge candidates respectively.

2. The boundary detecting method according to claim 1, wherein said candidate determining step further comprises a step of making a linear approximation for all of the edge segments for all of the search lines to find an edge candidate.

3. The boundary detecting method according to claim 1, wherein said candidate determining step further comprises a step of making a linear approximation for a part of the edge segments along a center among the edge segments for all of the search lines to find an edge candidate.

4. The boundary detecting method according to claim 3, wherein said candidate determining step further comprises a step of obtaining an average of absolute values of a difference between adjacent edges in a search direction, and a plus-side step of making a linear approximation for a set obtained by adding an edge segment whose absolute value of a difference is within a plus range of a threshold value from the average to the edge segments along the center, and setting a line obtained by the linear approximation as an edge candidate.

5. The boundary detecting method according to claim 3, wherein said candidate determining step further comprises a step of obtaining an average of absolute values of a difference between adjacent edges in a search direction, and a minus-side step of making a linear approximation for a set obtained by adding an edge segment whose absolute value of a difference is within a minus range of a threshold value from the average to edge segments along the center, and setting a line obtained by the linear approximation as an edge candidate.

6. The boundary detecting method according to claim 4, wherein said candidate determining step further comprises a minus-side step of making a linear approximation for a set obtained by adding an edge segment whose absolute value of a difference is within a minus range of a threshold value from the average to the edge segments along the center, and setting a line obtained by the linear approximation as an edge candidate.

7. The boundary detecting method according to claim 4, further comprising a step of changing the threshold value by a predetermined change amount.

8. The boundary detecting method according to claim 6, further comprising a step of changing the threshold value by a predetermined change amount, wherein said changing step comprises a step of setting an initial value of the threshold value to 0, and a step of stopping the threshold value from changing if a maximum absolute value of a difference is included within the minus or the plus range of the threshold value from the average.

9. The boundary detecting method according to claim 1, wherein said candidate determining step further comprises a step of making a linear approximation for a part of the edge segments along a center and to the right of the edge segments for all of the search lines to find an edge candidate.

10. The boundary detecting method according to claim 1, wherein said candidate determining step further comprises a step of making a linear approximation for a part of the edge segments along a center and to the left of the edge segments for all of the search lines to find an edge candidate.

11. A computer-readable storage medium on which is encoded a boundary detecting program, when being executed, for causing the computer to execute a process for detecting one edge configuring a boundary of a source document from an image obtained by capturing the source document with a scanner, the process comprising:

a step of detecting edge segments by searching all of search lines in the image from an extremity of the image in a direction perpendicular to the top, bottom, left or right edge to be detected;

a step of extracting a ruled line from the source document in the image;

a step of detecting edge segments by searching all of the search lines from a vicinity of a center of the image toward the extremity of the image, if a line whose edge segment cannot be detected exists; and a step of determining a line approximating the top, bottom, left or right edge from the edge segments detected for all of the search lines, wherein each search line comprises a plurality of search blocks;

each search block is more than one pixel high and more than one pixel wide;

the search block corresponding to a portion of the edge to be detected is detected as the edge segment;

each of the edge segments is defined by a length of a search block image portion corresponding to an edge, as detected in the searching of the search lines;

said step of determining line further comprises a candidate determining step of obtaining a plurality of edge candidates from the edge segments for all of the search lines, and a selecting step of selecting an optimum candidate from among the plurality of edge candidates on a basis of a difference between first and second differences between each of the plurality of edge candidates and the ruled line, wherein the first and second differences regarding one of the plurality of edge candidates are defined as a length of an axis from a first or second end of the ruled line to the one of the plurality of edge candidates respectively.

12. A device, comprising:

a processing unit executing:

a first detection unit for detecting edge segments by searching all of the search lines in the image from an extremity of the image in a direction perpendicular to the top, bottom, left or right edge to be detected, wherein each search line comprises a plurality of search blocks, each search block is more than one pixel high and more than one pixel wide, the search block corresponding to a portion of the edge to be detected is detected as the edge segment, and each of the edge segments is defined by a length of a search block image portion corresponding to an edge, as detected in the searching of the search lines;

a second detection unit for detecting edge segments by searching all of the search lines from a vicinity of a center of the image toward the extremity of the image, if a line whose edge segment cannot be detected exists;

an extraction unit for extracting a ruled line from the source document in the image; and a determination unit for determining a line approximating the top, bottom, left or right edge from the edge segments detected for all of the search lines, wherein the determination unit comprises a candidate determination unit for obtaining a plurality of edge candidates from the edge segments for all of the search lines, and a selection unit for selecting an optimum candidate from among the plurality of edge candidates on a basis of a difference between first and second differences between each of the plurality of edge candidates and the ruled line, wherein the first and second differences regarding one of the plurality of edge candidates are defined as a length of an axis from a first or second end of the ruled line to the one of the plurality of edge candidates respectively.

13. A copier, comprising:

a processing unit executing:

a first detection unit for detecting edge segments by searching all of the search lines in the image from an extremity of the image in a direction perpendicular to the top, bottom, left or right edge to be detected, wherein each search line comprises a plurality of search blocks, each search block is more than one pixel high and more than one pixel wide, the search block corresponding to a portion of the edge to be detected is detected as the edge segment, and each of the edge segments is defined by a length of a search block image portion corresponding to an edge, as detected in the searching of the search lines;

a second detection unit for detecting edge segments by searching all of the search lines from a vicinity of a center of the image toward the extremity of the image, if a line whose edge segment cannot be detected exists;

an extraction unit for extracting a ruled line from the source document in the image; and a determination unit for determining a line approximating the top, bottom, left or right edge from the edge segments detected for all of the search lines, wherein the determination unit comprises a candidate determination unit for obtaining a plurality of edge candidates from the edge segments for all of the search lines, and a selection unit for selecting an optimum candidate from among the plurality of edge candidates on a basis of a difference between first and second differences between each of the plurality of edge candidates and the ruled line, wherein the first and second differences regarding one of the plurality of edge candidates are defined as a length of an axis from a first or second end of the ruled line to the one of the plurality of edge candidates respectively.

* * * * *